(12) United States Patent
Neuman et al.

(10) Patent No.: US 6,524,714 B1
(45) Date of Patent: Feb. 25, 2003

(54) HEAT TREATABLE COATED ARTICLES WITH METAL NITRIDE LAYER AND METHODS OF MAKING SAME

(75) Inventors: George Neuman, Ann Arbor, MI (US); Grzegorz Stachowiak, Ann Arbor, MI (US); Hong Wang, Belleville, MI (US)

(73) Assignee: Guardian Industries Corp., Auburn Hills, MI (US)

( * ) Notice: Subject to any disclaimer, the term of this patent is extended or adjusted under 35 U.S.C. 154(b) by 0 days.

(21) Appl. No.: 09/847,663

(22) Filed: May 3, 2001

(51) Int. Cl.$^7$ .............................. B32B 17/06
(52) U.S. Cl. .................. 428/428; 428/432; 428/448; 428/697; 428/698; 428/699; 428/701; 428/702; 427/165; 427/372.7; 427/397.7; 427/404; 427/419.1; 427/419.2; 427/419.7
(58) Field of Search ................. 428/428, 432, 428/448, 697, 698, 699, 701, 702; 427/165, 372.2, 397.7, 404, 419.1, 419.2, 419.7

(56) References Cited

U.S. PATENT DOCUMENTS

| | | |
|---|---|---|
| 3,682,528 A | 8/1972 | Apfel et al. |
| 5,188,887 A | 2/1993 | Linge et al. |
| 5,298,048 A | 3/1994 | Lingle et al. |
| 5,344,718 A | 9/1994 | Hartig et al. |
| 5,377,045 A | 12/1994 | Wolfe et al. |
| 5,514,476 A | 5/1996 | Hartig et al. |
| 5,521,765 A | 5/1996 | Wolfe |
| 5,563,734 A | 10/1996 | Wolfe et al. |
| 5,688,585 A | 11/1997 | Lingle et al. |
| 5,770,321 A | 6/1998 | Hartig et al. |
| 5,800,933 A | 9/1998 | Hartig et al. |
| 5,942,338 A | 8/1999 | Arbab et al. |
| 6,014,872 A | 1/2000 | Hartig et al. |
| 6,059,909 A | 5/2000 | Hartig et al. |
| 6,132,881 A | 10/2000 | Hartig et al. |
| 6,159,607 A | 12/2000 | Hartig et al. |

FOREIGN PATENT DOCUMENTS

WO    WO 01/21540    3/2001

OTHER PUBLICATIONS

Patent Abstracts of Japan, vol. 017, No. 489, Sep. 6, 1993, JP 05 124839, May 21, 1993.
Technical Digest 1995, "Optical Interference Coatings", Wolfe et al., vol. 17, pps. 115–117, Jun. 5–9.
"High Temperature Corrosion", Per KOFSTAD, Dept. of Chemistry, Univ. of Oslo, Norway, Elsevier Applied Science, London and New York, 1988, pp. 360–371, (No month).
U.S. patent application Ser.No. 09/455,026 filed Dec. 6, 1999.
U.S. patent application Ser. No. 09/778,949 filed Feb. 8, 2001.
U.S.patent application Ser. No. 09/793,404 filed Feb. 27, 2001.
U.S. Provisional application Ser. No. 60/187,039, filed Mar. 6, 2000.

*Primary Examiner*—Deborah Jones
*Assistant Examiner*—Andrew T Piziali
(74) *Attorney, Agent, or Firm*—Nixon & Vanderhye P.C.

(57) ABSTRACT

A heat treatable coated article including a solar management layer for reflecting infrared (IR) or the like, is provided between a substrate and an overlying dielectric layer. An underlying dielectric layer between the substrate and solar management layer is optional. In certain embodiments, the solar management layer may include $NiCrN_x$ while the dielectric layer(s) may include a nitride such as silicon nitride. By nitriding the solar management layer, it has been found that the resulting coated article is more color stable upon heat treatment (HT). For example, the coated article may have a ΔE* value (transmissive and/or glass side reflective) of no greater than 5.0, more preferably no greater than 4.0, and most preferably no greater than 3.0. Coated articles herein may be used in the context of insulating glass (IG) window units, vehicle windows, or the like.

42 Claims, 21 Drawing Sheets

HEAT TREATABLE COATED ARTICLES WITH METAL NITRIDE LAYER AND METHODS OF MAKING SAME

This invention relates to coated articles that have approximately the same color characteristics as viewed by the naked eye before and after heat treatment (e.g., thermal tempering), and corresponding methods. Such coated articles may be used in insulating glass (IG) units, vehicle windows, and/or other suitable applications.

BACKGROUND OF THE INVENTION

The need for color matchability of coated articles (before heat treatment vs. after heat treatment) is known. Glass substrates are often produced in large quantities and cut to size in order to fulfill the needs of a particular situation such as a new multi-window and door office building, vehicle window needs, etc. It is often desirable in such applications that some of the windows and/or doors be heat treated (i.e., tempered, heat strengthened or bent), while others need not be. Office buildings often employ IG units and/or laminates for safety and/or thermal control. It is often desirable that the units and/or laminates which are heat treated (HT) substantially match their non-heat treated counterparts (e.g., with regard to color, reflectance, and/or the like) for architectural and/or aesthetic purposes.

U.S. Pat. No. 5,376,455 discloses a coated article including: glass/$Si_3N_4$/NiCr/Ag/NiCr/$Si_3N_4$. Unfortunately, the coating system of the '455 patent is not sufficiently color matchable after heat treatment with its non-heat-treated counterpart. In other words, the coating system of the '455 patent has a rather high ΔE value. This means that, unfortunately, two different coated articles with different coatings (one to be heat treated, the other not to be) must be made for customers who want their heat-treated and non-heat-treated coated articles to approximately match colorwise as viewed by the naked eye.

As with the '455 patent, it has mostly been possible to achieve matchability only by providing two different layer systems, one of which is heat treated (HT) and the other is not. The necessity of developing and using two different layer systems to achieve matchability creates additional manufacturing expense and inventory needs which are undesirable.

However, commonly owned U.S. Pat. No. 5,688,585 discloses a solar control coated article including glass/$Si_3N_4$/NiCr/$Si_3N_4$, wherein matchability is achieved with a single layer system. As explained at column 9 of the '585 patent, it is a "requirement" of the '585 invention that the NiCr layer be substantially free of any nitride. An object of the '585 patent is to provide a sputter coated layer system that after heat treatment is matchable colorwise with its non-heat-treated counterpart. However, the '585 patent uses a heat treatment (HT) of only three (3) minutes (col. 10, line 55). Longer heat treatments are often desired in order to attain better tempering or HT characteristics. Unfortunately, as explained below, it has been found that with longer HT times the coatings of the '585 patent cannot maintain low ΔE values and thus lose color matchability. In particular, it has surprisingly been found by the instant inventor that in coatings such as that of the '585 patent, ΔE values jump significantly upward after HT for 4–5 minutes at a temperature of from about 600 to 800 degrees C.

Consider the following layer stack (see Example 7 below): glass/$Si_3N_4$/NiCr/$Si_3N_4$, where the underlayer of $Si_3N_4$ is about 50–70 Å (angstroms) thick, the NiCr layer is about 325 Å thick (the NiCr layer is not nitrided as deposited as can be seen in FIG. 15), and the overcoat of $Si_3N_4$ is about 210–310 Å thick. As explained in Example 7 below, this coated article has a rather high transmissive ΔE* value of about 5.9 after a heat treatment (HT) at 625 degrees C. for ten (10) minutes. This high transmissive ΔE value means that a HT version of the '585 coated article does not approximately match colorwise non-heat-treated counterpart versions with regard to transmissive color after 10 minutes of HT. This is not desirable.

The instant inventor believes that the high ΔE* value associated with the coating of Example 7 herein is caused for at least the following reasons. FIG. 15 is an XPS plot illustrating the Example 7 coating before heat treatment (HT), while FIG. 16 illustrates the Example 7 coating after HT. As shown in FIG. 15, before heat treatment the three different layers are fairly separate and distinct. For example, prior to HT it can be seen that the Ni slopes 3 on either side of the NiCr layer are very steep, as are the Si and N slopes 5 and 7, respectively, on the lower side of the upper $Si_3N_4$ layer. Therefore, the vast majority of the Ni is located in the NiCr layer and the vast majority of the Si and N from the upper $Si_3N_4$ layer is located in that layer. However, FIG. 16 illustrates that when the FIG. 15 coated article of Example 7 is heat treated (HT) for 10 minutes as discussed above, a significant portion of the Ni from the NiCr layer migrates into the upper $Si_3N_4$ layer. Additionally, upon HT a significant portion of the Si and N from the upper $Si_3N_4$ layer migrates into the NiCr layer. In other words, the interface between the metal NiCr layer and the upper $Si_3N_4$ layer becomes blurred and non-distinct. This is evidenced in FIG. 16 by the less steep slope 3a of the Ni on the upper/outer side of the NiCr layer, and by the less steep slopes 5a and 7a of the Si and N on the lower side of the upper $Si_3N_4$ layer. Still further, it can be seen by comparing FIGS. 15 and 16 that HT causes a significant amount of the Cr in the NiCr layer to migrate within that layer toward the upper side thereof so that it is not as uniformly distributed compared to pre-HT.

Unfortunately, the aforesaid migrations of the Si, N, Ni and Cr from their FIG. 15 positions to their respective FIG. 16 positions due to HT causes significant color shifting to occur and thus explains the large transmissive ΔE* value associated with the coating of Ex. 7, and thus with coatings of the '585 patent when exposed to lengthy heat treatments.

In view of the above, it will be apparent to those skilled in the art that there exists a need for a coating or layer system that has a low ΔE (or ΔE*) value(s) (transmissive and/or glass side reflective) and thus good color matchability characteristics after at least five (5) minutes of heat treatment (HT). It is a purpose of this invention to fulfill the above-listed need, and/or other needs which will become more apparent to the skilled artisan once given the following disclosure.

SUMMARY OF THE INVENTION

An object of this invention is to provide a coating or layer system that has good color stability (i.e., a low ΔE* value(s)) with heat treatment (HT).

Another object of this invention is to provide a coating or layer system having a ΔE* value (transmissive and/or glass side reflective) no greater than 5.0 (more preferably no greater than 4.0, and most preferably no greater than 3.0) upon heat treatment (HT) at a temperature of at least about 600 degrees C. for a period of time of at least 5 minutes (more preferably at least 7 minutes, and most preferably at least 9 minutes).

Another object of this invention is to nitride a Ni and/or Cr inclusive layer (e.g., a NiCr layer) to an extent so as to enable the resulting coated article to have the aforesaid low ΔE value(s).

Another object of this invention is to fulfill one or more of the above-listed objects.

Generally speaking, certain example embodiments of this invention fulfill one or more of the above listed objects and/or needs by providing a coated article comprising:

a layer system supported by a glass substrate, said layer system comprising a metal nitride inclusive layer located between first and second dielectric layers, wherein the second dielectric layer is at least partially nitrided and positioned so that the metal nitride inclusive layer is between the second dielectric layer and the glass substrate; and wherein said coated article has a transmissive $\Delta E^*_T$ value no greater than 5.0 after at least about 5 minutes of heat treatment at a temperature(s) of at least about 600 degrees C.

Certain other example embodiments of this invention fulfill one or more of the above-listed objects and/or needs by providing a coated article comprising:

a layer system supported by a glass substrate, said layer system comprising a metal nitride inclusive layer located between said glass substrate and an at least partially nitrided dielectric layer, wherein the metal nitride comprises at least one of $NiN_x$ and $CrN_x$ and contacts said dielectric layer; and wherein said coated article has a glass side reflective $\Delta E^*_G$ value no greater than 5.0 in view of thermal tempering including heat treating for at least about 5 minutes.

Certain other example embodiments of this invention fulfill one or more of the above-listed objects and/or needs by providing a coated article comprising:

a layer system supported by a glass substrate, said layer system comprising a $NiCrN_x$ inclusive layer wherein at least 50% of the Cr is nitrided, said $NiCrN_x$ inclusive layer being located between and contacting first and second dielectric layers, wherein the second dielectric layer is at least partially nitrided and positioned so that the $NiCrN_x$ inclusive layer is between the second dielectric layer and the glass substrate; and wherein said coated article has a transmissive $\Delta E^*_T$ value no greater than 5.0 following or due to heat treatment.

Still further example embodiments of this invention fulfill one or more of the above-listed objects and/or needs by providing a method of making a coated article, the method comprising:

providing a glass substrate;

depositing (e.g., via sputtering or any other suitable method/technique) a metal on the substrate in an atmosphere including a significant amount of nitrogen in order to form a metal nitride inclusive layer on the glass substrate;

depositing (e.g., via sputtering or any other suitable method/technique) a dielectric nitride inclusive layer on the substrate over the metal nitride inclusive layer; and heat treating the article which includes at least the metal nitride inclusive layer and the dielectric nitride inclusive layer for at least 5 minutes, the metal nitride inclusive layer being nitrided to an extent so that after said heat treating the article has a ΔE value of no greater than 5.0.

This invention will now be described with respect to certain embodiments thereof as illustrated in the following drawings, wherein:

IN THE DRAWINGS

Figure 3:
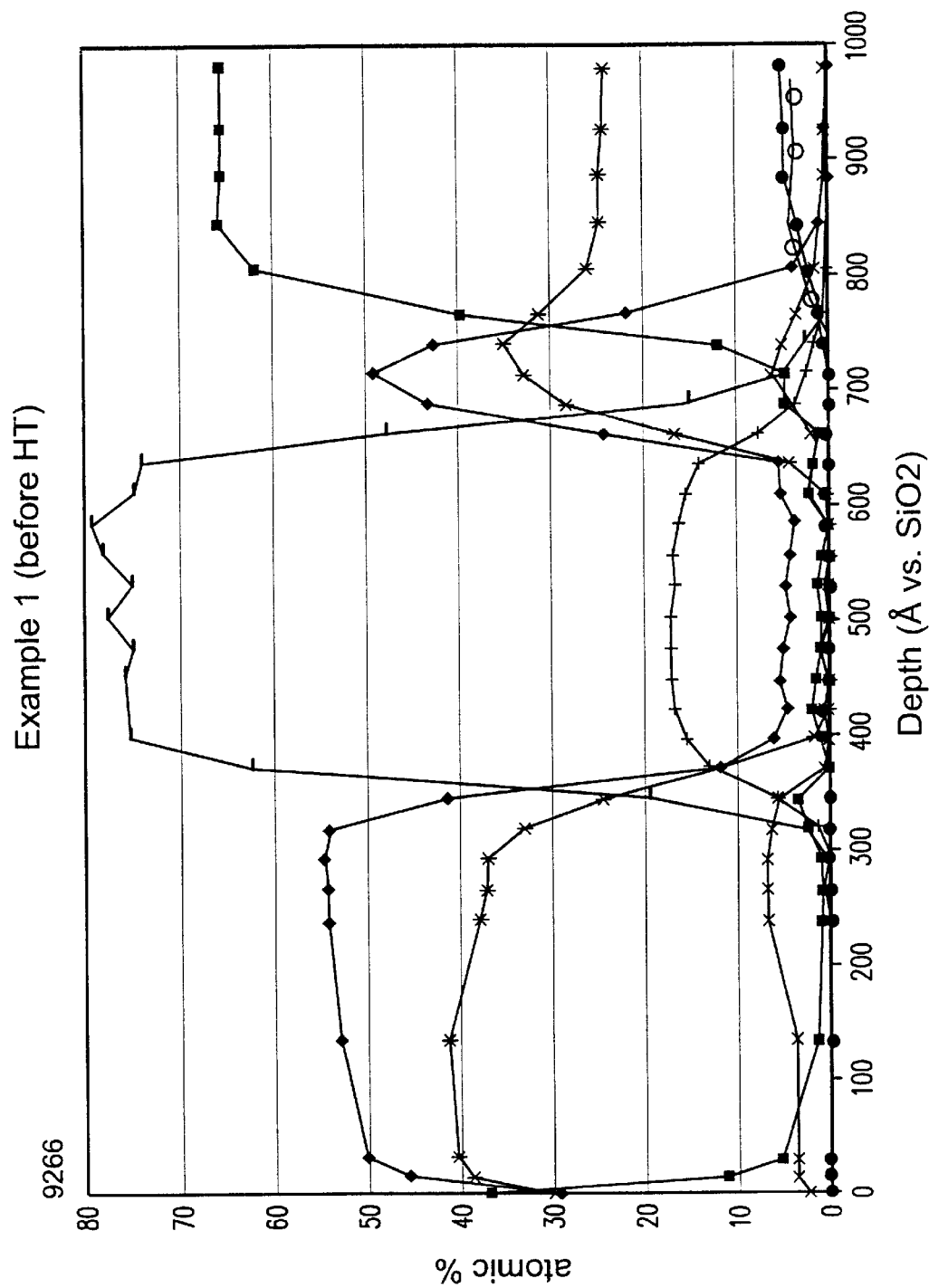

FIG. 3 is an x-ray photoelectron spectroscopy (XPS) graph illustrating the atomic % of components N, O, Na, Al, Si, Ca, Cr, and Ni throughout the thickness of a layer system according to Example 1 of this invention (before heat treatment), where the "depth" axis refers to the depth into the coating and/or substrate from the exterior surface thereof as compared to the depth into a conventional $SiO_2$ layer that would have been achieved over the same period of time (i.e., the Å depth is not actual depth, but instead is how deep into a reference $SiO_2$ layer sputtering would have reached over the corresponding time).

Figure 4:
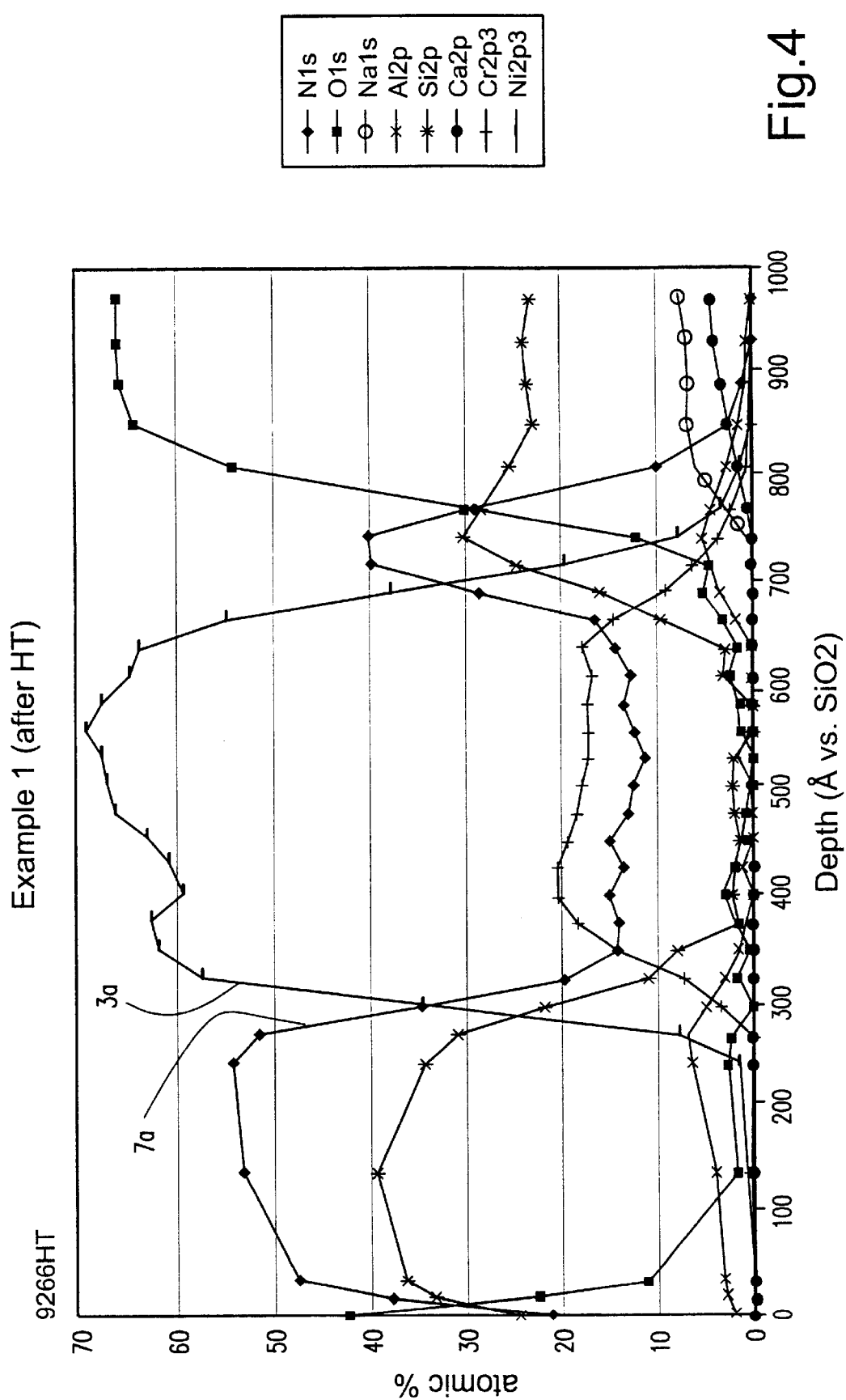

FIG. 4 is an XPS graph illustrating the atomic % of components N, O, Na, Al, Si, Ca, Cr, and Ni throughout the thickness of the layer system according to Example 1 of this invention after heat treatment at 625 degrees C. for 10 minutes.

Figure 5:
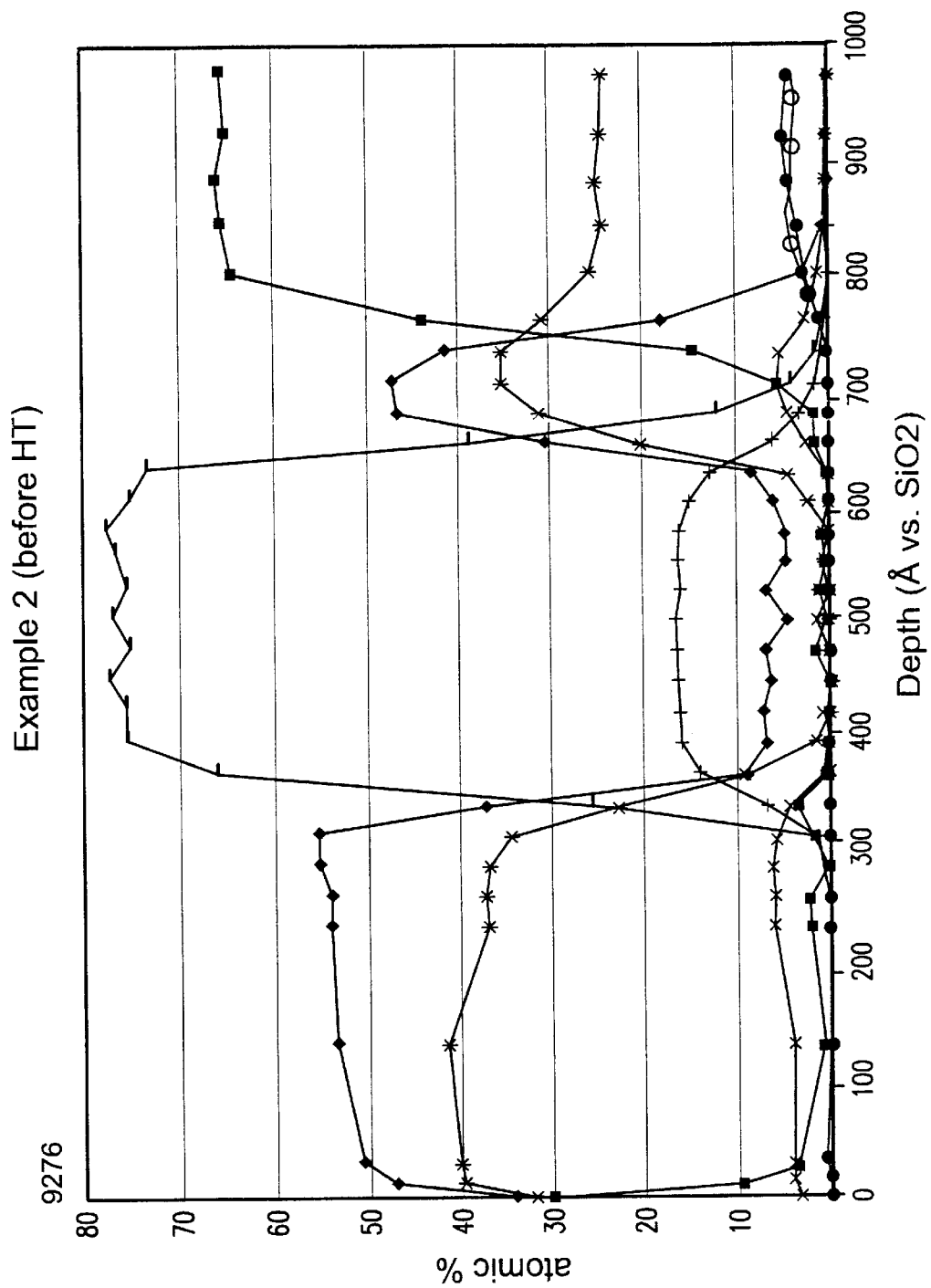

FIG. 5 is an x-ray photoelectron spectroscopy (XPS) graph illustrating the atomic % of components N, O, Na, Al, Si, Ca, Cr, and Ni throughout the thickness of a layer system according to Example 2 of this invention (before heat treatment), where the "depth" axis refers to the depth into the coating and/or substrate from the exterior surface thereof as compared to the depth into a conventional $SiO_2$ layer that would have been achieved over the same period of time.

Figure 6:
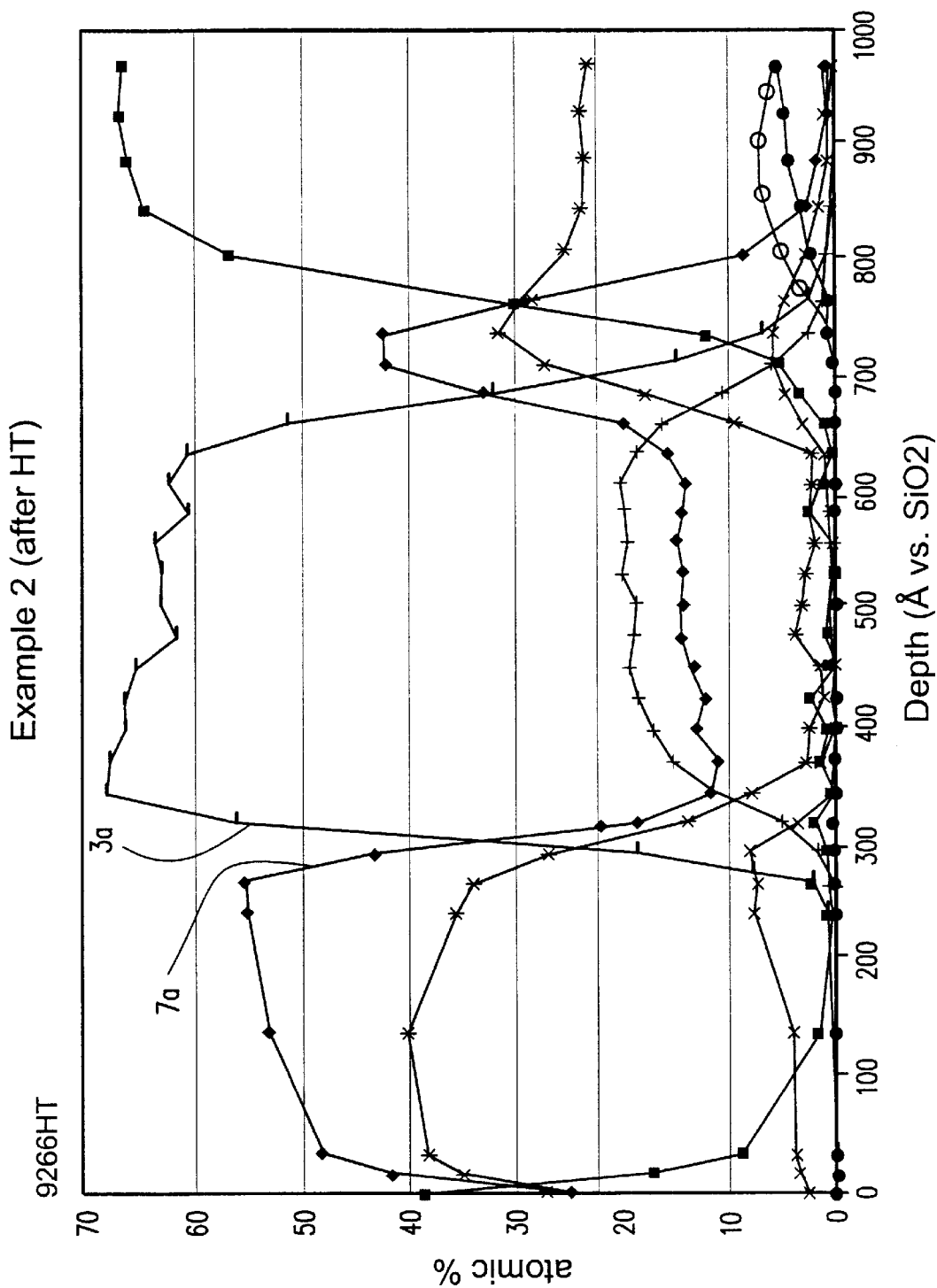

FIG. 6 is an XPS graph illustrating the atomic % of components N, O, Na, Al, Si, Ca, Cr, and Ni throughout the thickness of the layer system according to Example 2 of this invention after heat treatment at 625 degrees C. for 10 minutes.

Figure 7:
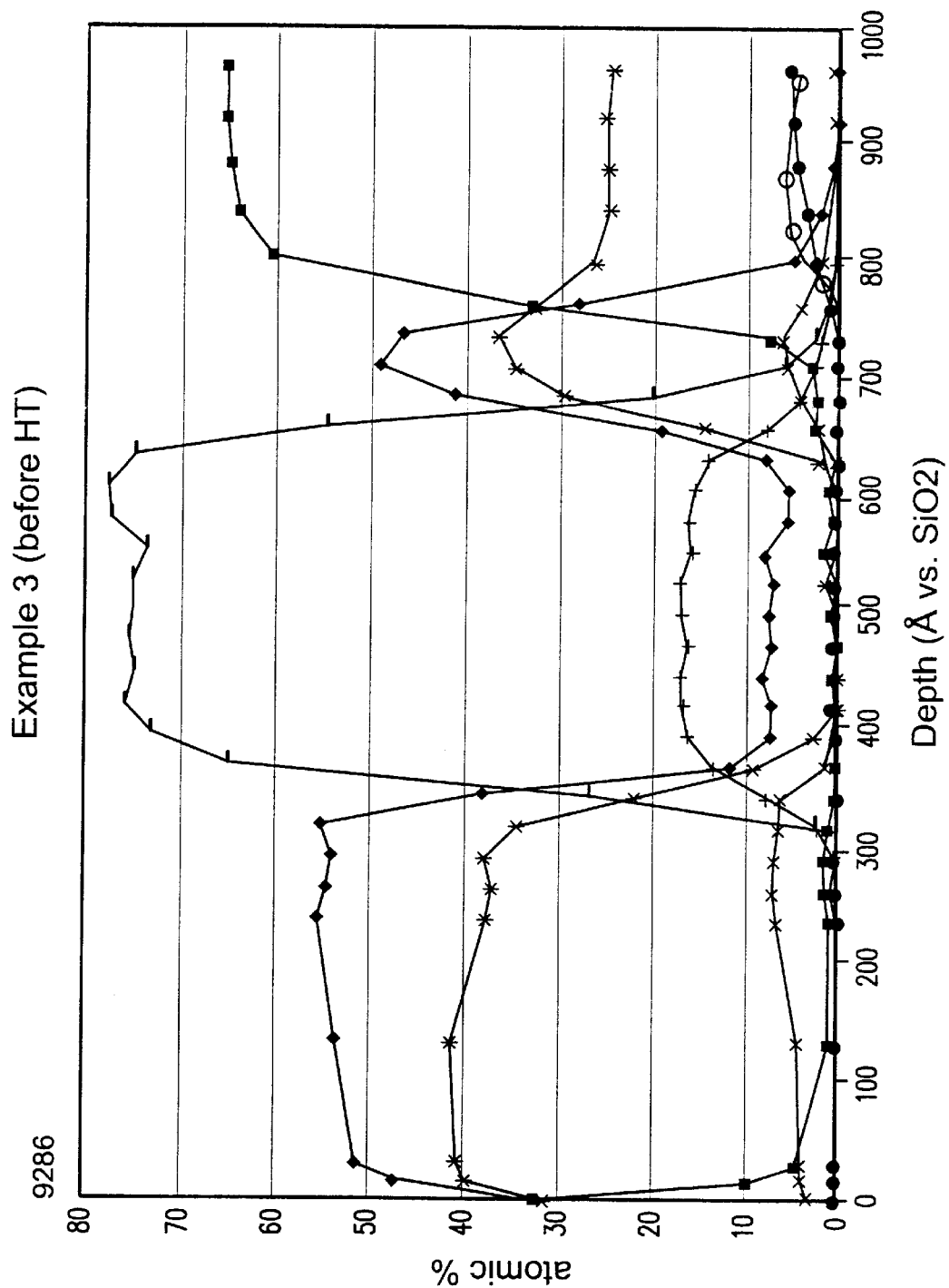

FIG. 7 is an x-ray photoelectron spectroscopy (XPS) graph illustrating the atomic % of components N, O, Na, Al, Si, Ca, Cr, and Ni throughout the thickness of a layer system according to Example 3 of this invention (before heat treatment), where the "depth" axis refers to the depth into the coating and/or substrate from the exterior surface thereof as compared to the depth into a conventional $SiO_2$ layer that would have been achieved over the same period of time.

Figure 8:
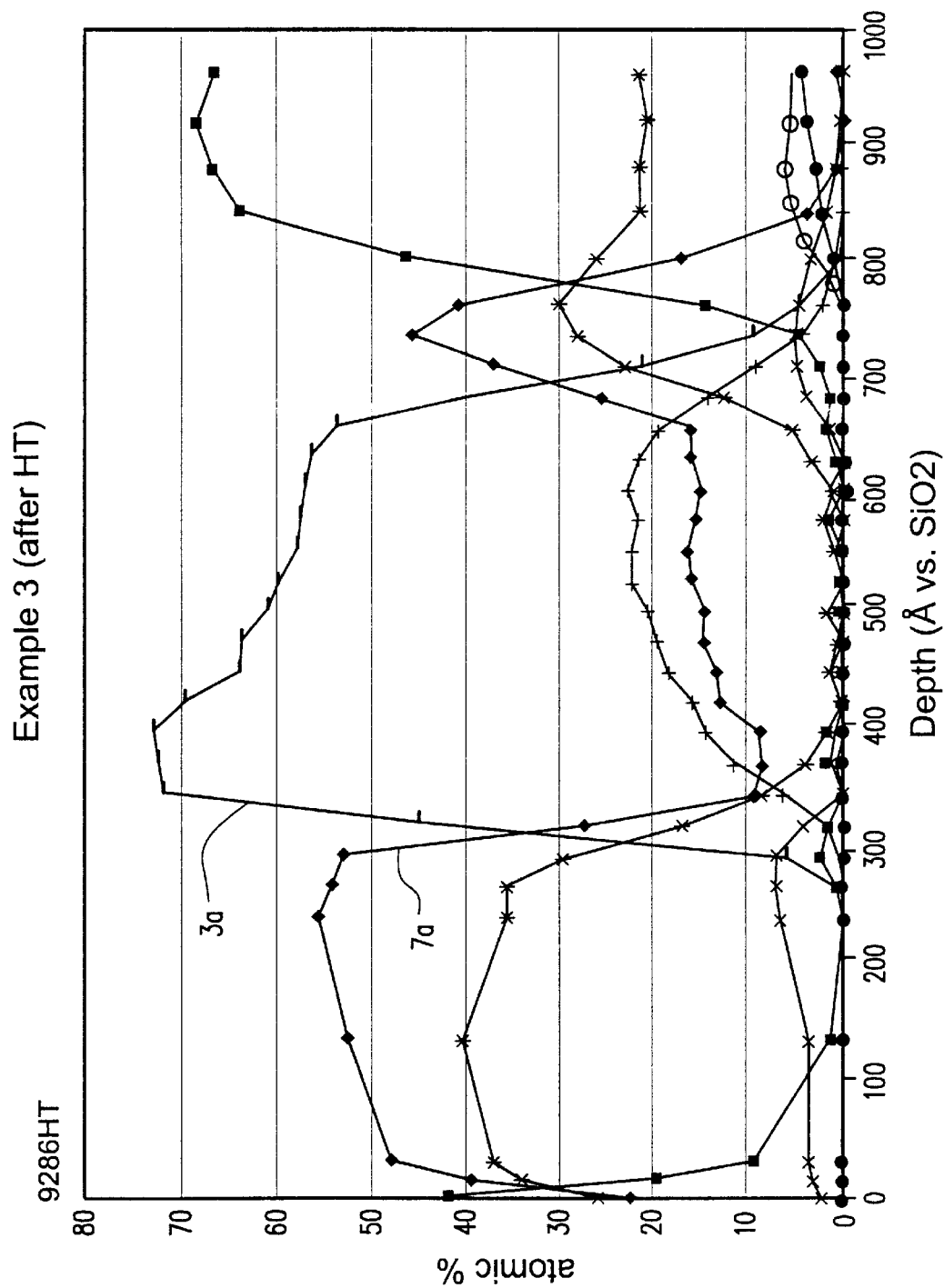

FIG. 8 is an XPS graph illustrating the atomic % of components N, O, Na, Al, Si, Ca, Cr, and Ni throughout the thickness of the layer system according to Example 3 of this invention after heat treatment at 625 degrees C. for 10 minutes.

Figure 9:
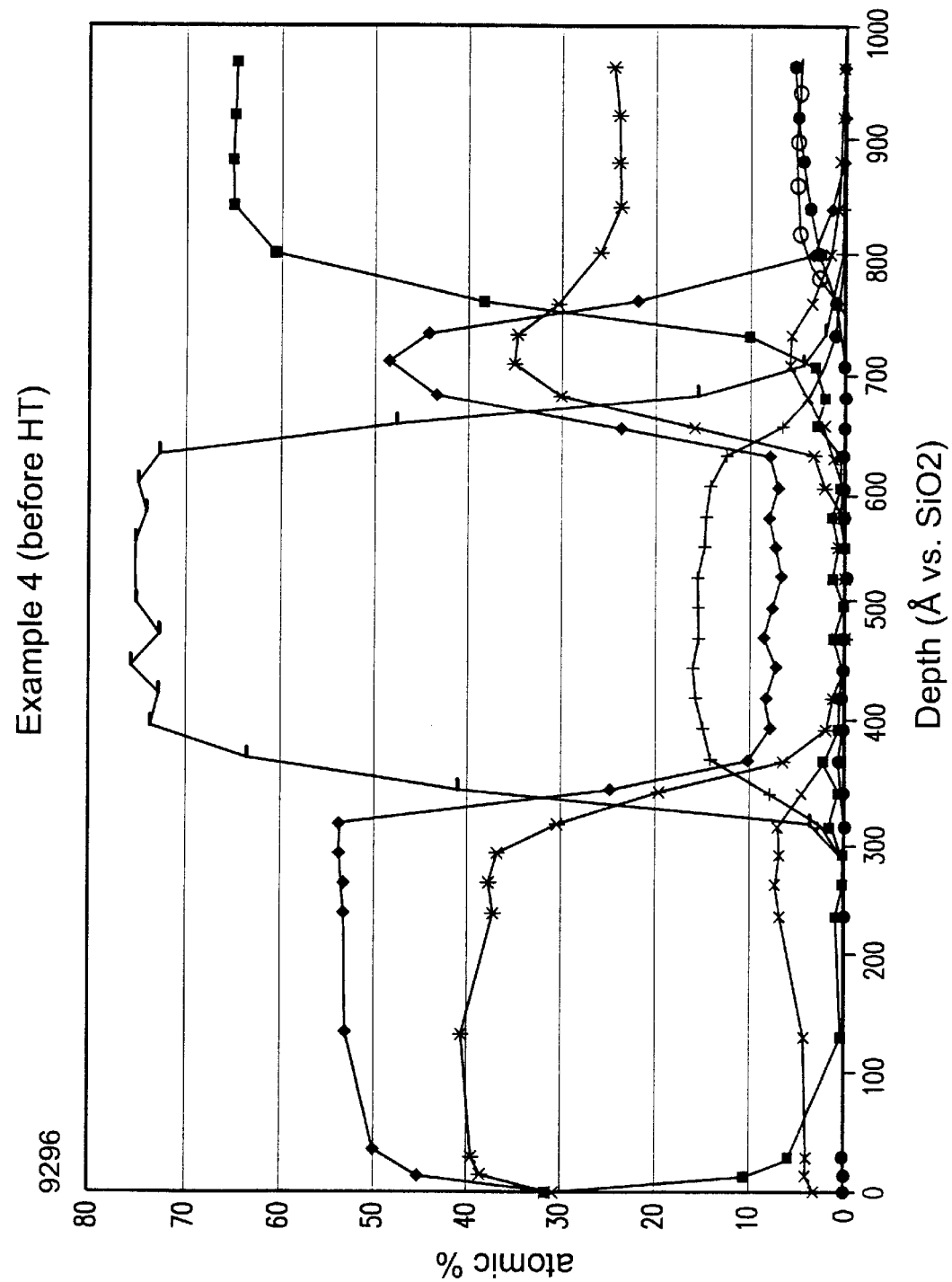

FIG. 9 is an x-ray photoelectron spectroscopy (XPS) graph illustrating the atomic % of components N, O, Na, Al, Si, Ca, Cr, and Ni throughout the thickness of a layer system according to Example 4 of this invention (before heat treatment), where the "depth" axis refers to the depth into the coating and/or substrate from the exterior surface thereof as compared to the depth into a conventional $SiO_2$ layer that would have been achieved over the same period of time.

Figure 10:
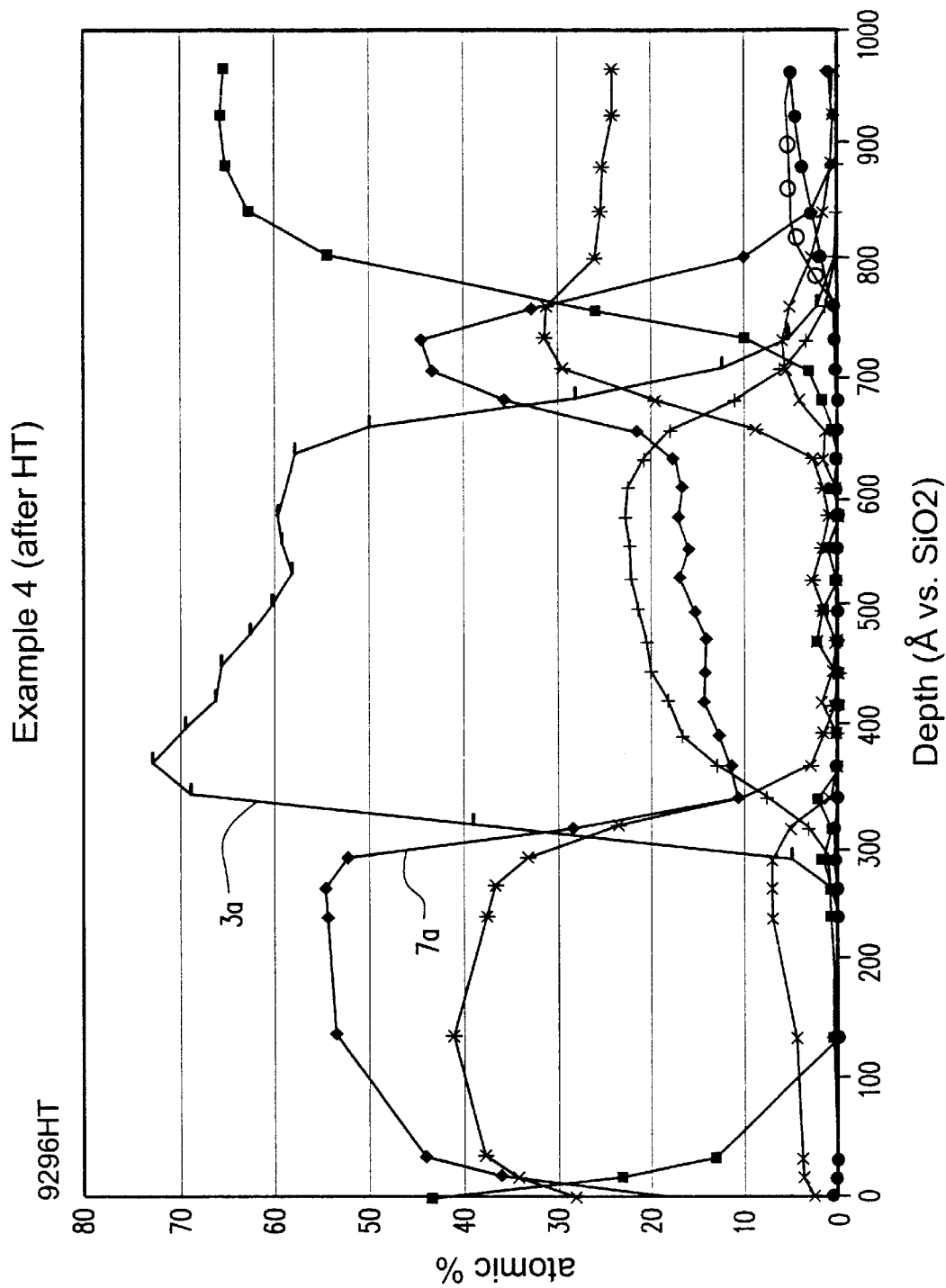

FIG. 10 is an XPS graph illustrating the atomic % of components N, O, Na, Al, Si, Ca, Cr, and Ni throughout the thickness of the layer system according to Example 4 of this invention after heat treatment at 625 degrees C. for 10 minutes.

Figure 11:
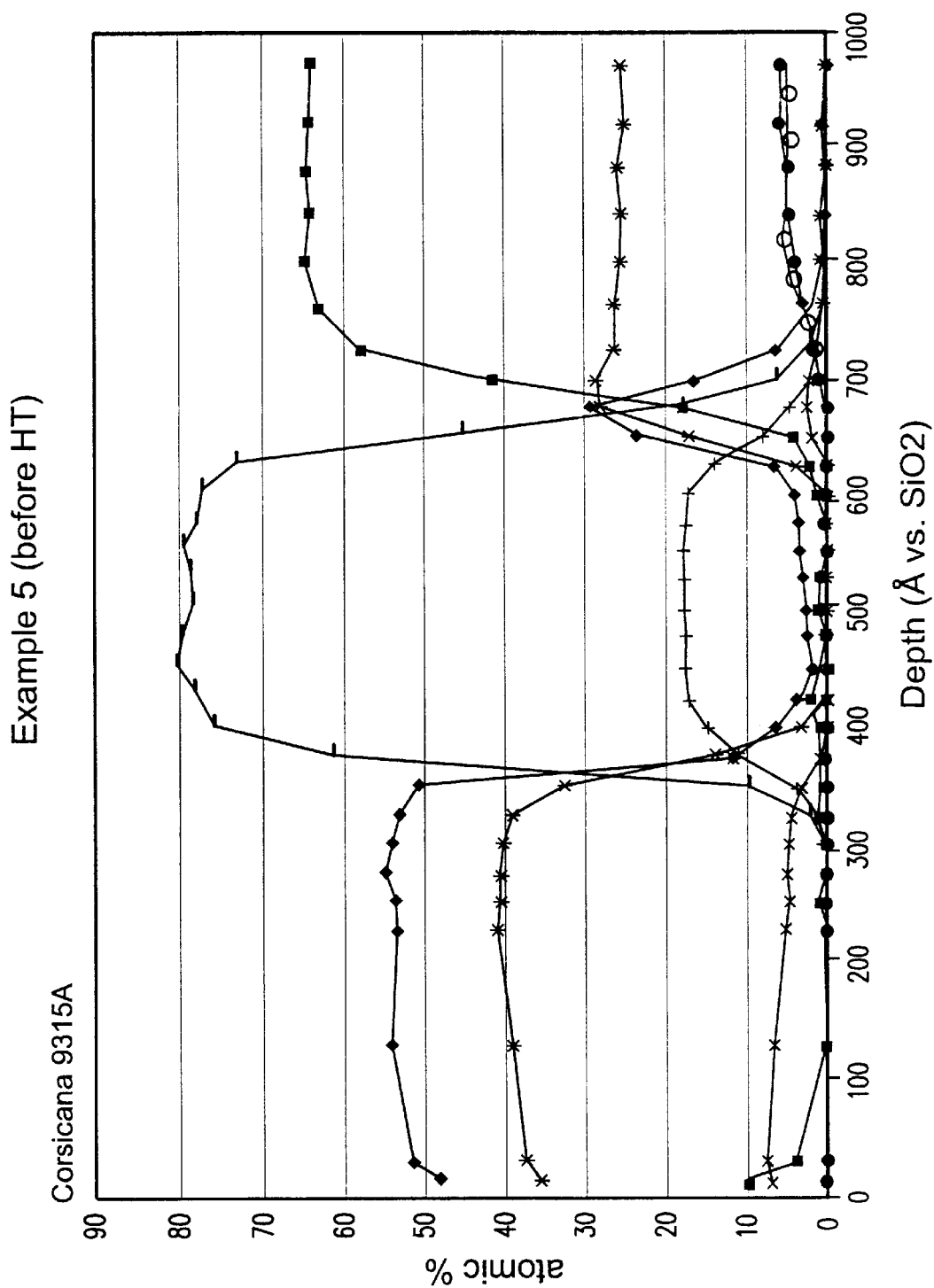

FIG. 11 is an x-ray photoelectron spectroscopy (XPS) graph illustrating the atomic % of components N, O, Na, Al, Si, Ca, Cr, and Ni throughout the thickness of a layer system according to Example 5 of this invention (before heat treatment), where the "depth" axis refers to the depth into the coating and/or substrate from the exterior surface thereof as compared to the depth into a conventional $SiO_2$ layer that would have been achieved over the same period of time.

Figure 12:
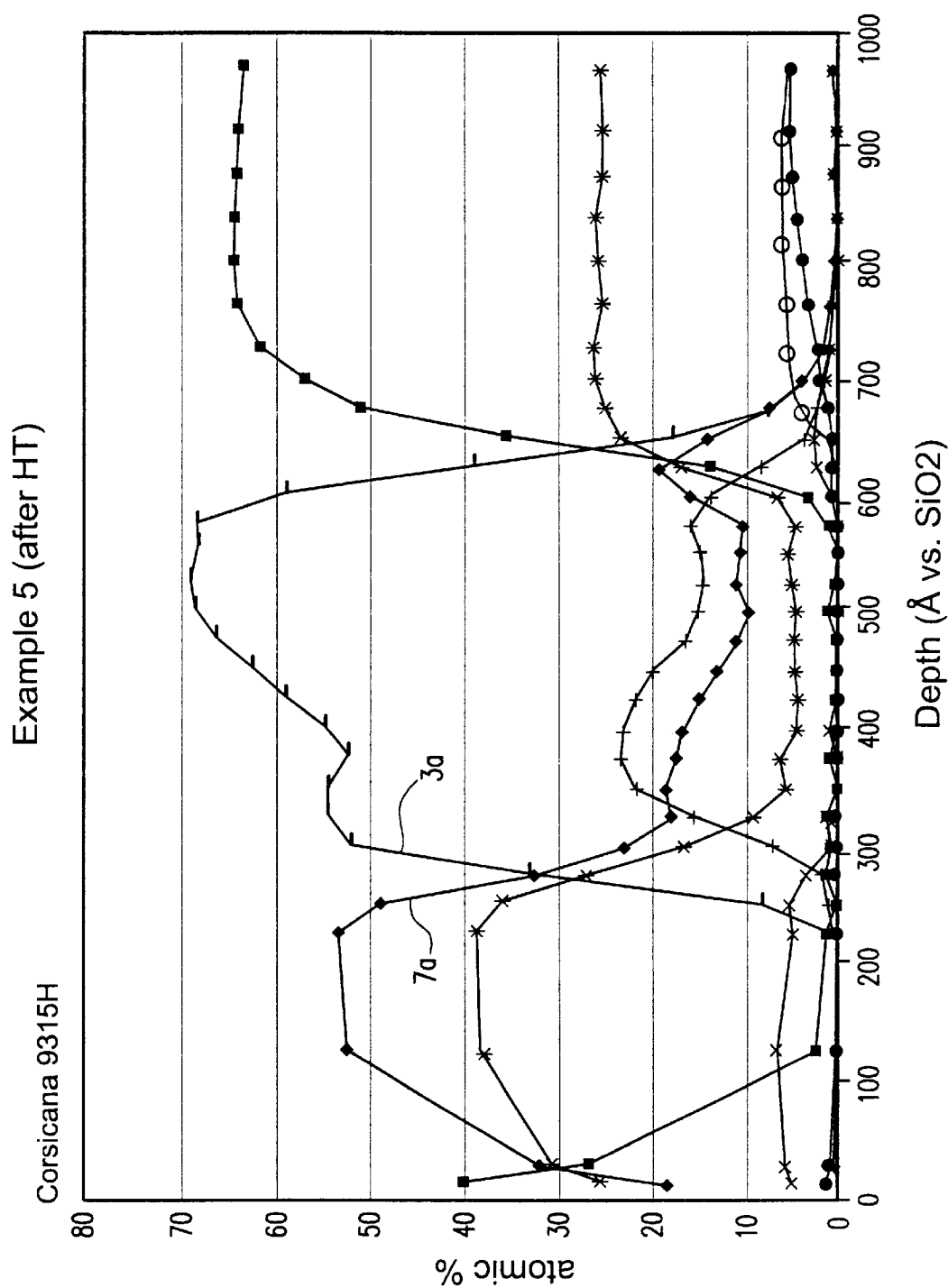

FIG. 12 is an XPS graph illustrating the atomic % of components N, O, Na, Al, Si, Ca, Cr, and Ni throughout the thickness of the layer system according to Example 5 of this invention after heat treatment at 625 degrees C. for 10 minutes.

Figure 13:
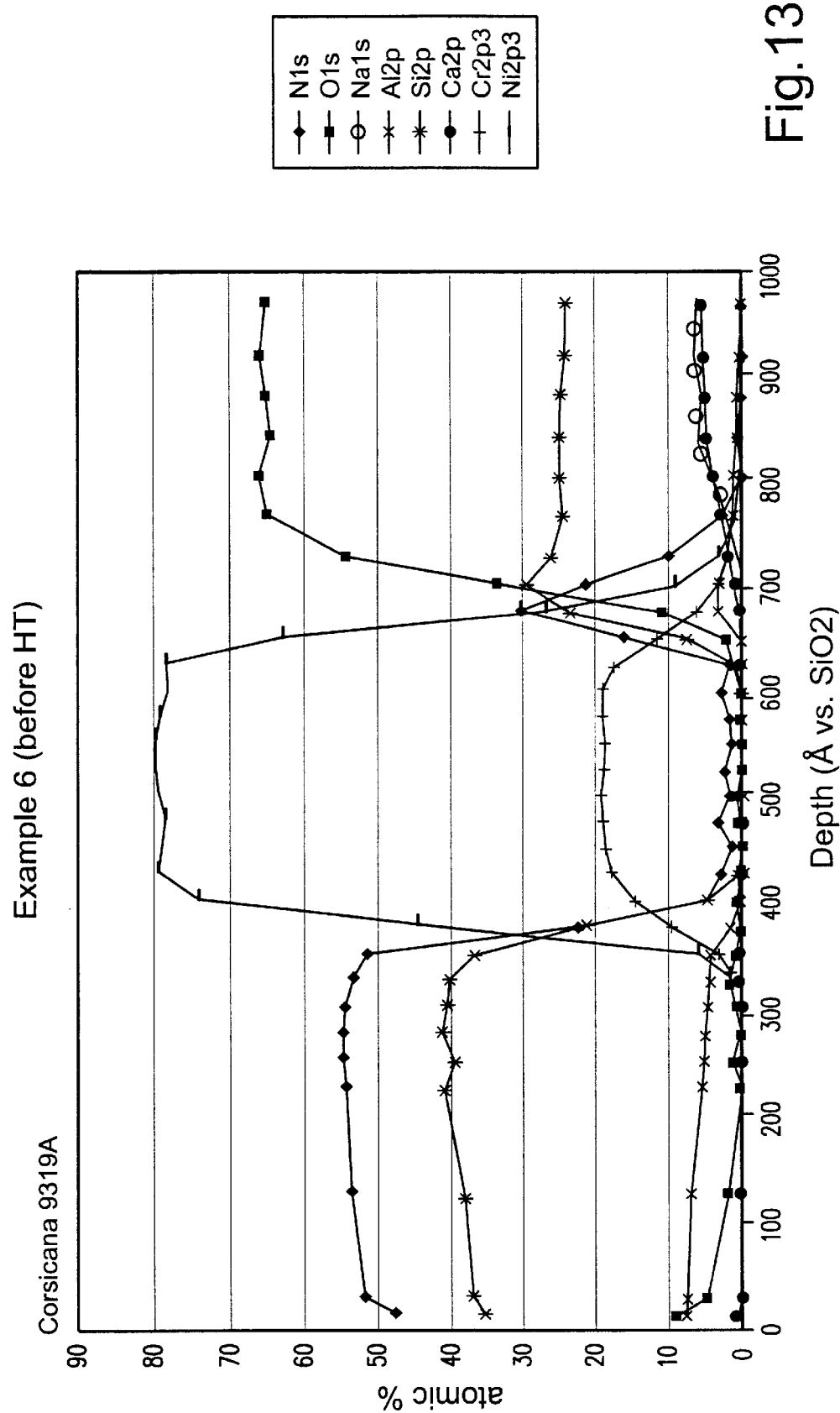

FIG. 13 is an x-ray photoelectron spectroscopy (XPS) graph illustrating the atomic % of components N, O, Na, Al, Si, Ca, Cr, and Ni throughout the thickness of a layer system according to Example 6 of this invention (before heat treatment), where the "depth" axis refers to the depth into the coating and/or substrate from the exterior surface thereof as compared to the depth into a conventional $SiO_2$ layer that would have been achieved over the same period of time.

Figure 14:
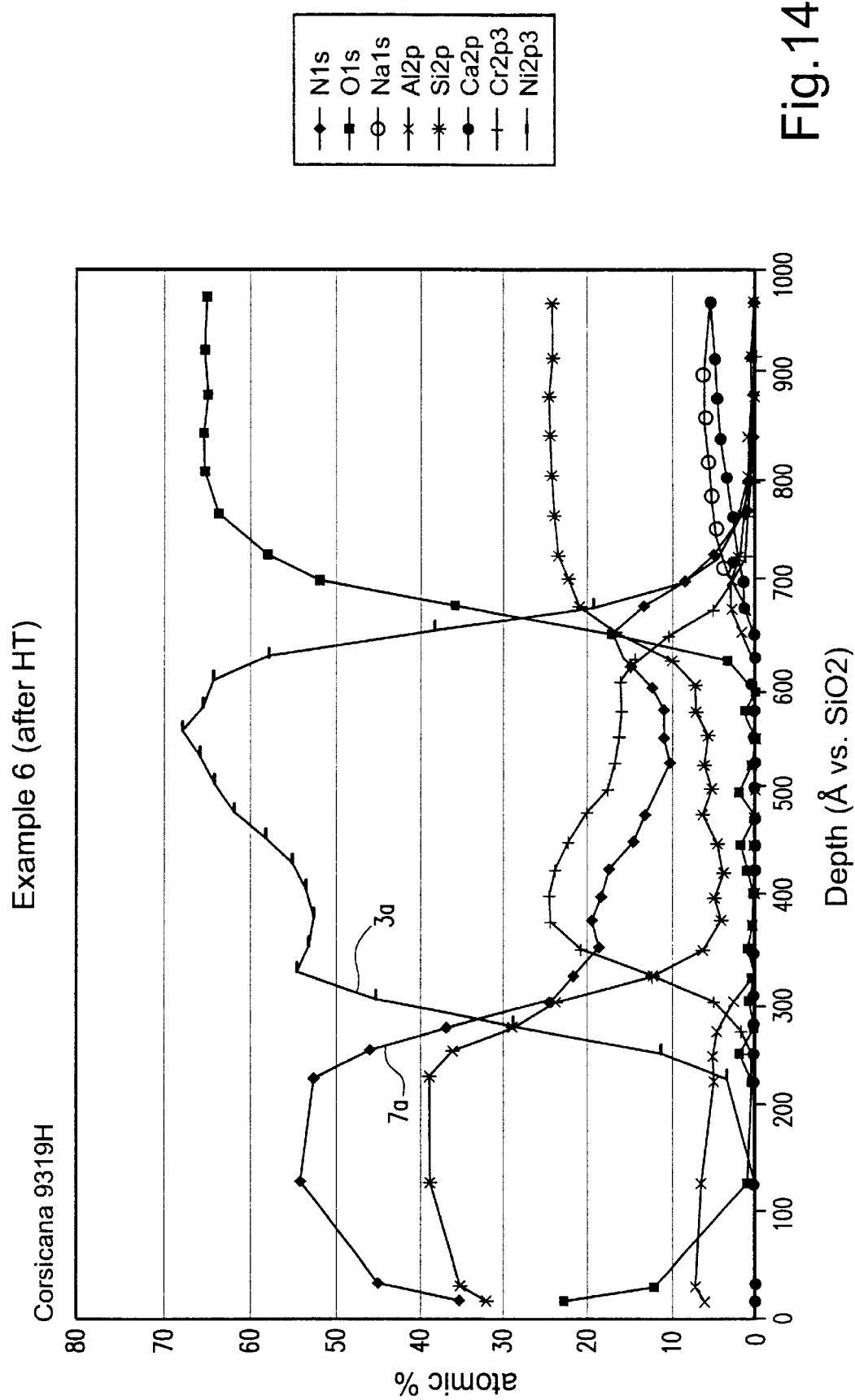

FIG. 14 is an XPS graph illustrating the atomic % of components N, O, Na, Al, Si, Ca, Cr, and Ni throughout the thickness of the layer system according to Example 6 of this invention after heat treatment at 625 degrees C. for 10 minutes.

Figure 15:
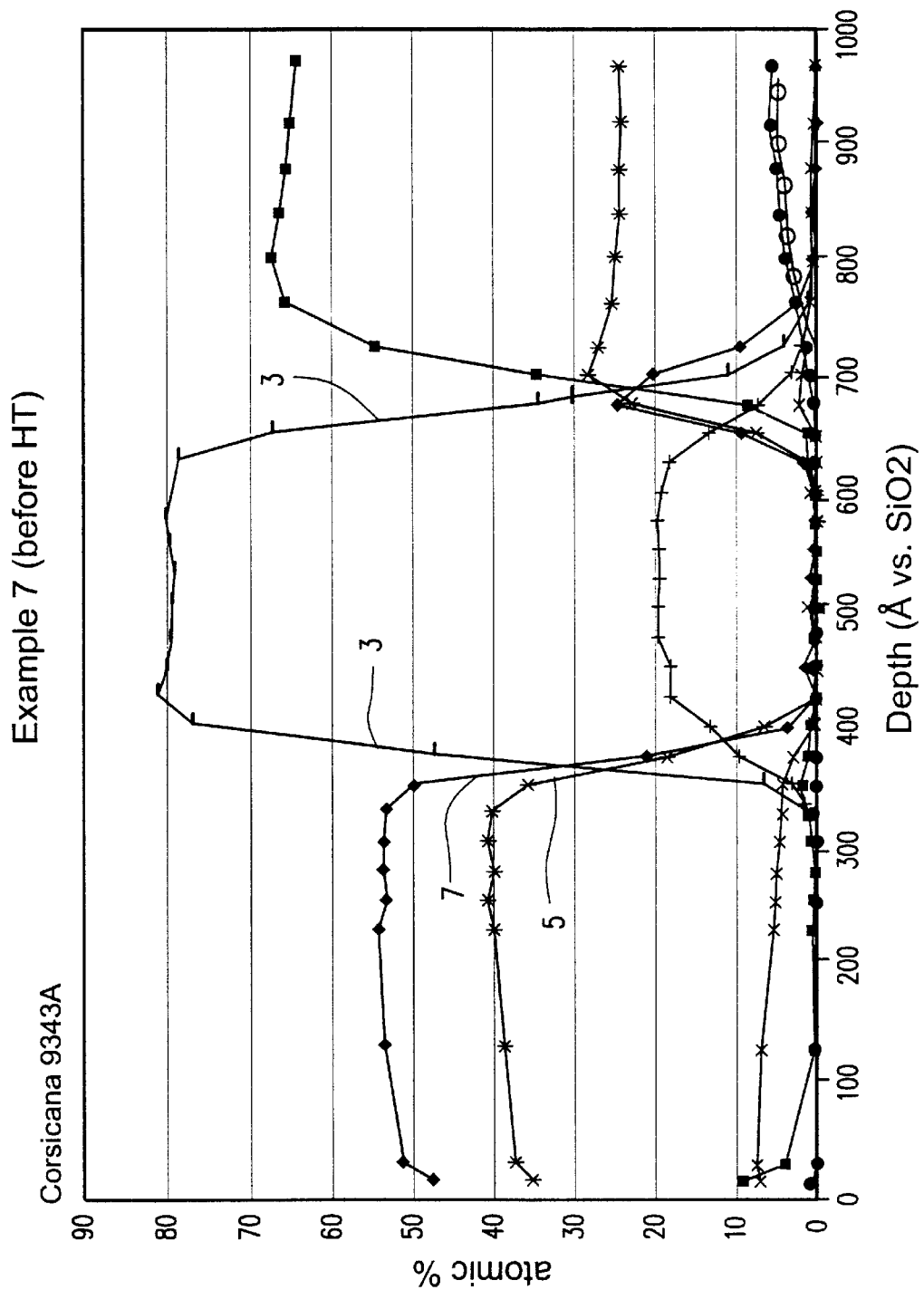

FIG. 15 is an x-ray photoelectron spectroscopy (XPS) graph illustrating the atomic % of components N, O, Na, Al, Si, Ca, Cr, and Ni throughout the thickness of a layer system according to Example 7 of this invention (before heat treatment), where the "depth" axis refers to the depth into the coating and/or substrate from the exterior surface thereof as compared to the depth into a conventional $SiO_2$ layer that would have been achieved over the same period of time.

Figure 16:
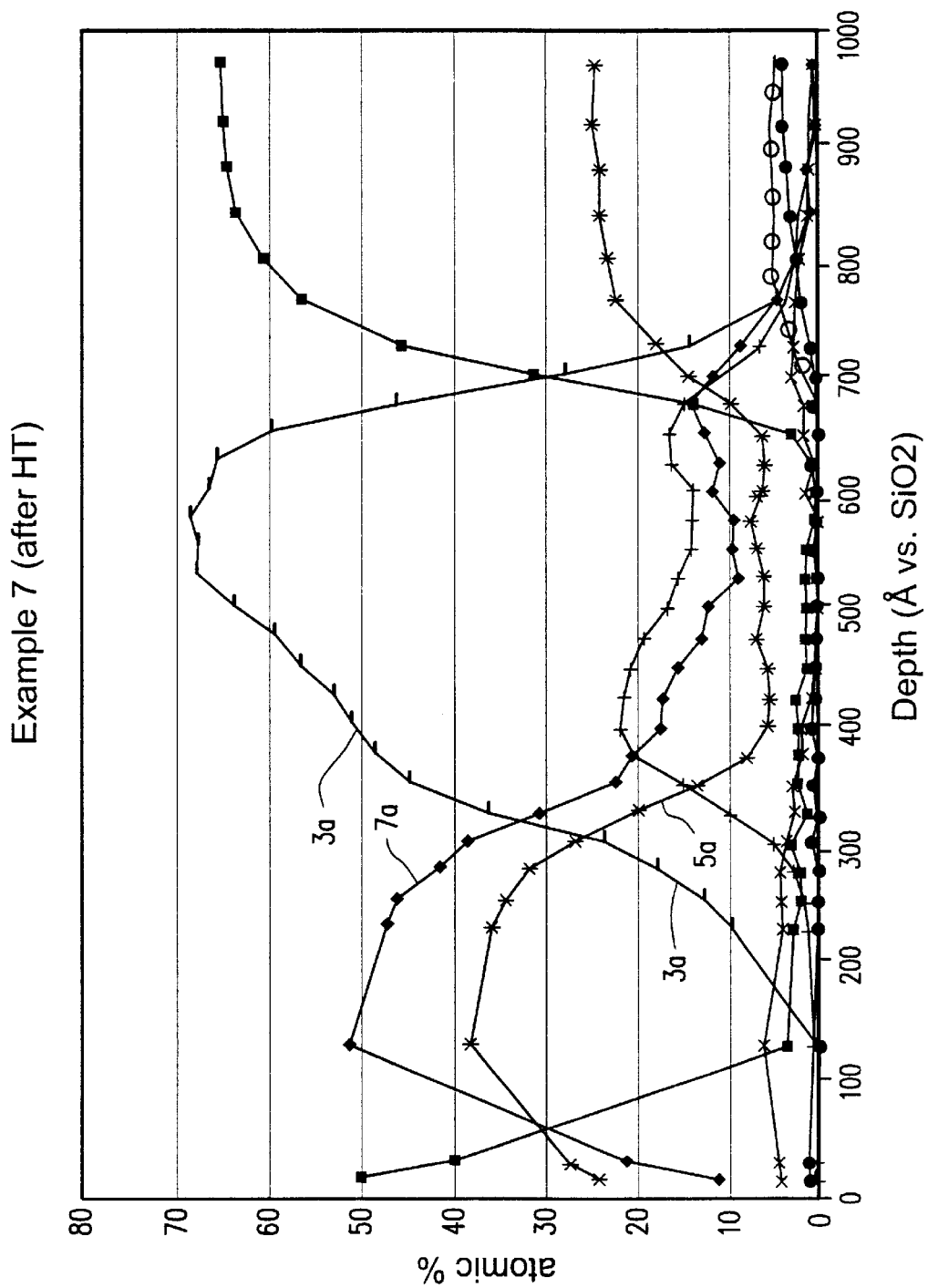

FIG. 16 is an XPS graph illustrating the atomic % of components N, O, Na, Al, Si, Ca, Cr, and Ni throughout the thickness of the layer system according to Example 7 of this invention after heat treatment at 625 degrees C. for 10 minutes.

Figure 17:
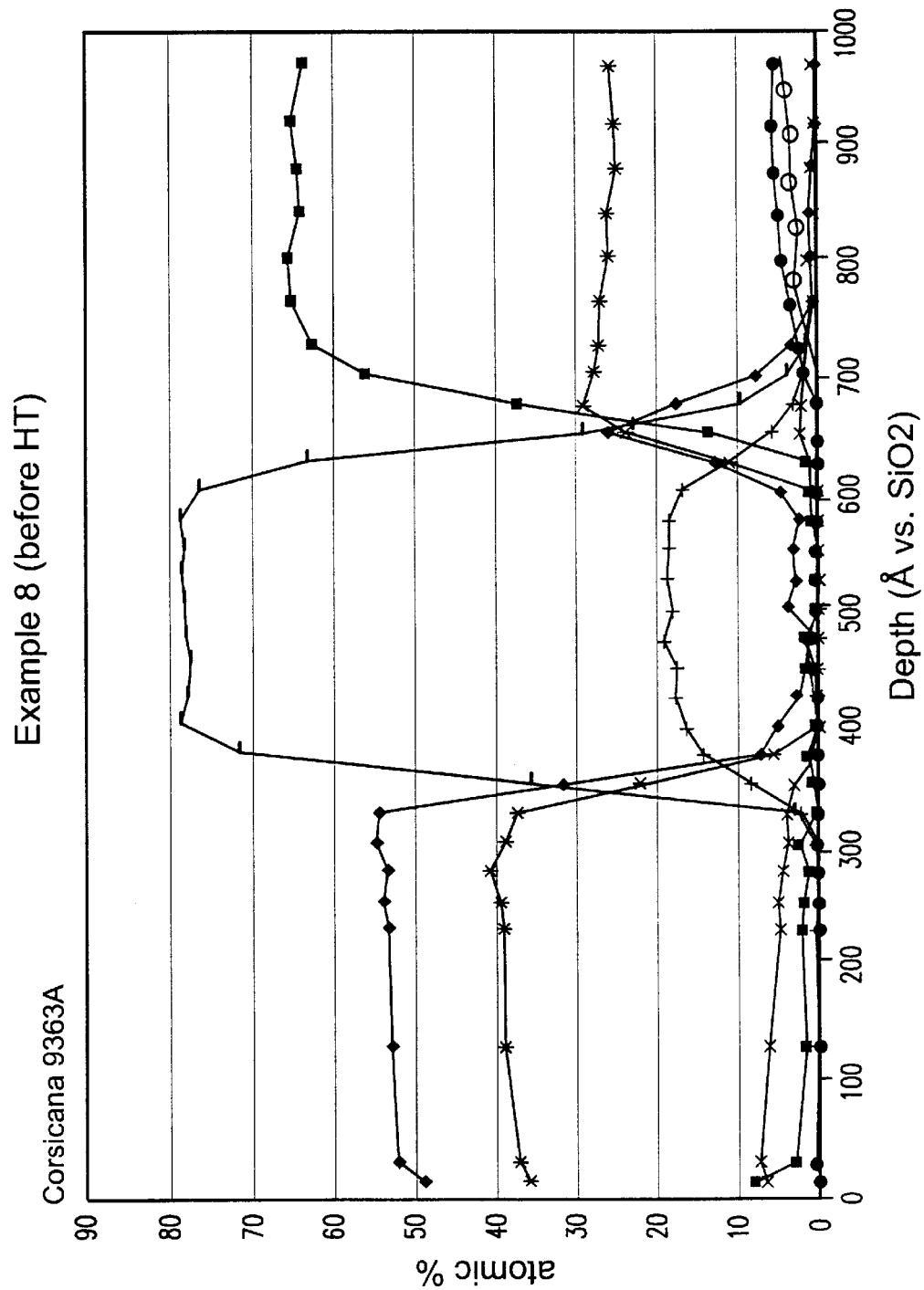

FIG. 17 is an x-ray photoelectron spectroscopy (XPS) graph illustrating the atomic % of components N, O, Na, Al, Si, Ca, Cr, and Ni throughout the thickness of a layer system according to Example 8 of this invention (before heat treatment), where the "depth" axis refers to the depth into the coating and/or substrate from the exterior surface thereof as compared to the depth into a conventional $SiO_2$ layer that would have been achieved over the same period of time.

Figure 18:
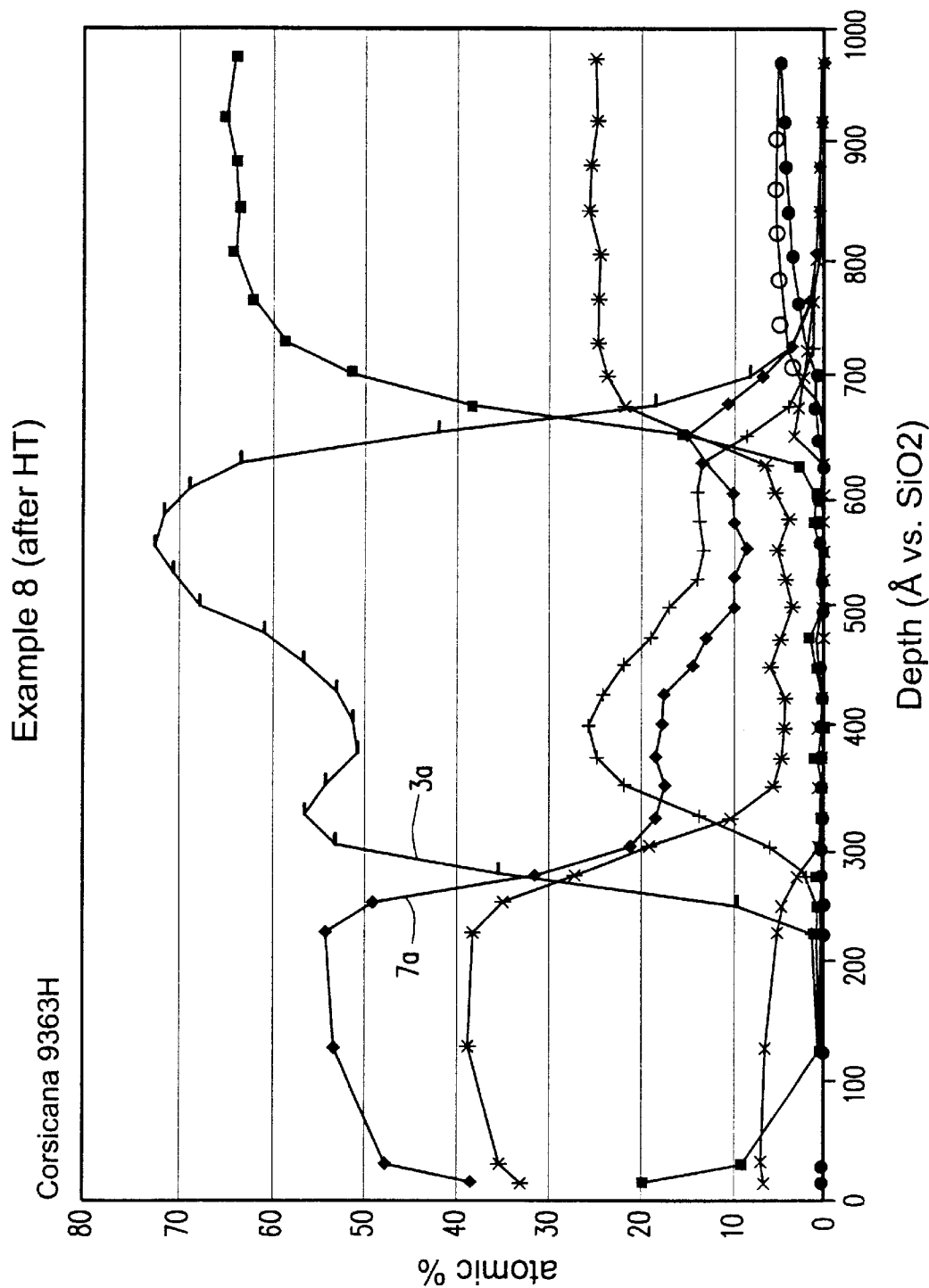

FIG. 18 is an XPS graph illustrating the atomic % of components N, O, Na, Al, Si, Ca, Cr, and Ni throughout the thickness of the layer system according to Example 8 of this invention after heat treatment at 625 degrees C. for 10 minutes.

Figure 19:
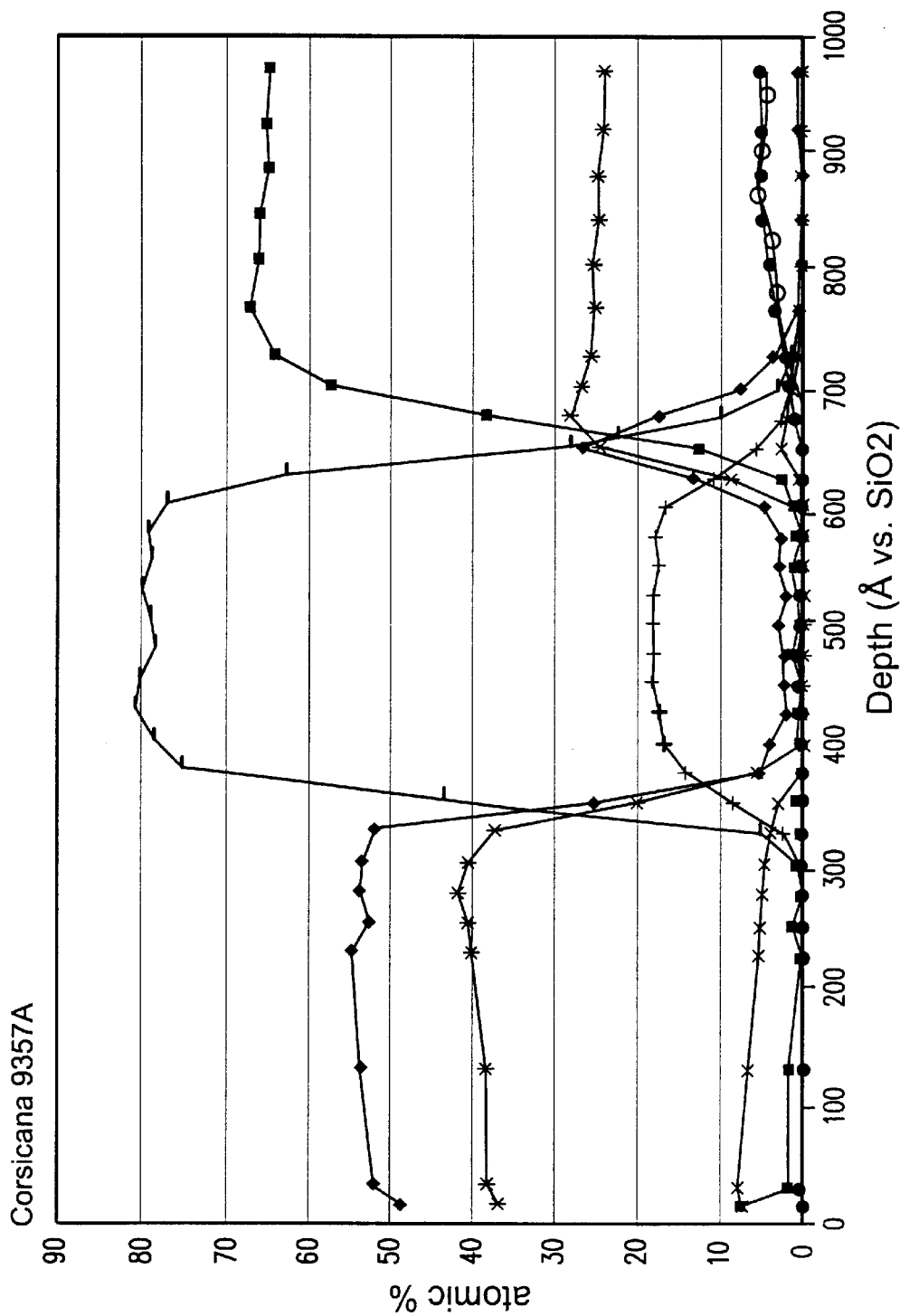

FIG. 19 is an x-ray photoelectron spectroscopy (XPS) graph illustrating the atomic % of components N, O, Na, Al, Si, Ca, Cr, and Ni throughout the thickness of a layer system according to Example 9 of this invention (before heat treatment), where the "depth" axis refers to the depth into the coating and/or substrate from the exterior surface thereof as compared to the depth into a conventional $SiO_2$ layer that would have been achieved over the same period of time.

Figure 20:
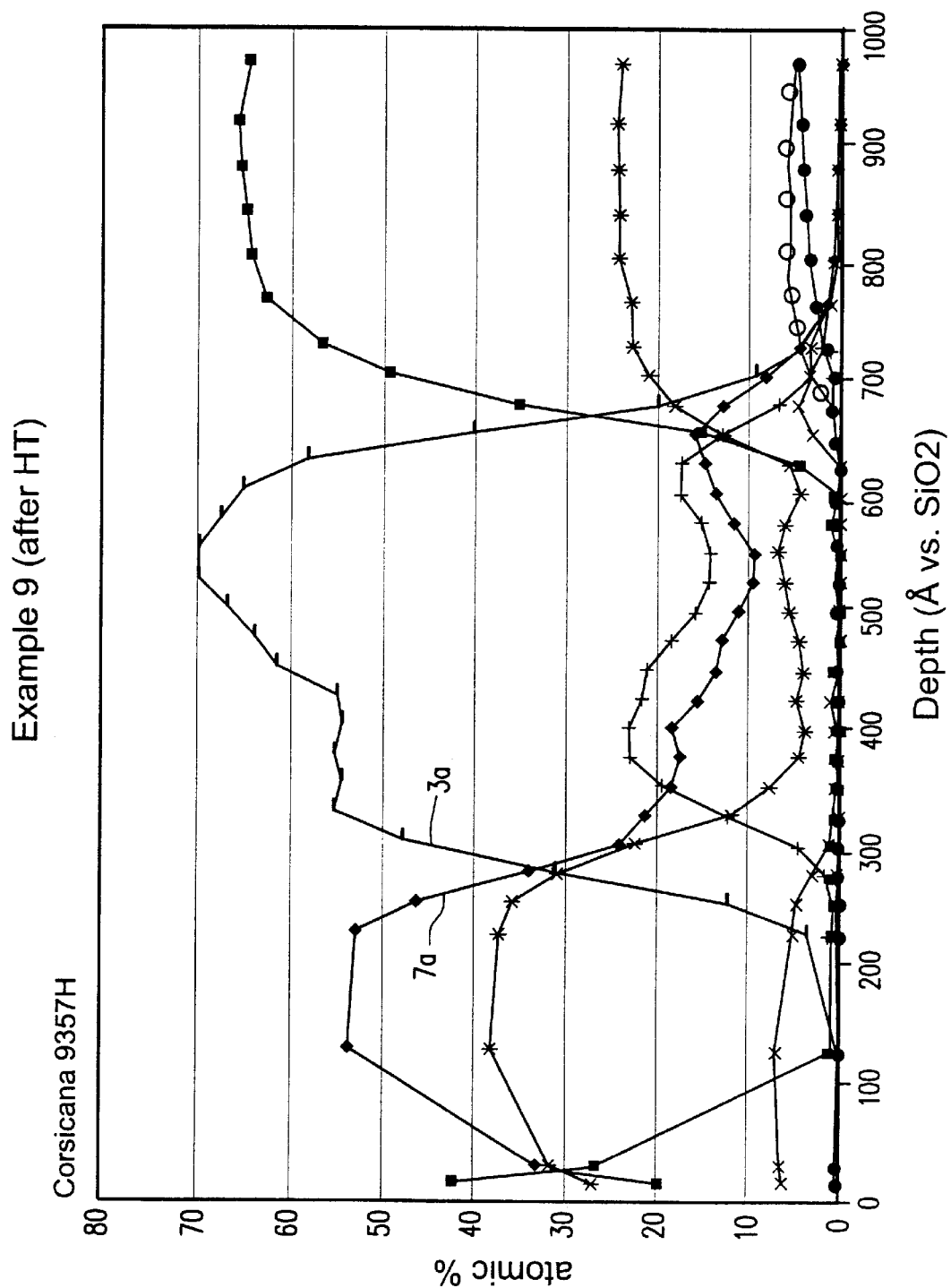

FIG. 20 is an XPS graph illustrating the atomic % of components N, O, Na, Al, Si, Ca, Cr, and Ni throughout the thickness of the layer system according to Example 9 of this invention after heat treatment at 625 degrees C. for 10 minutes.

Figure 21:
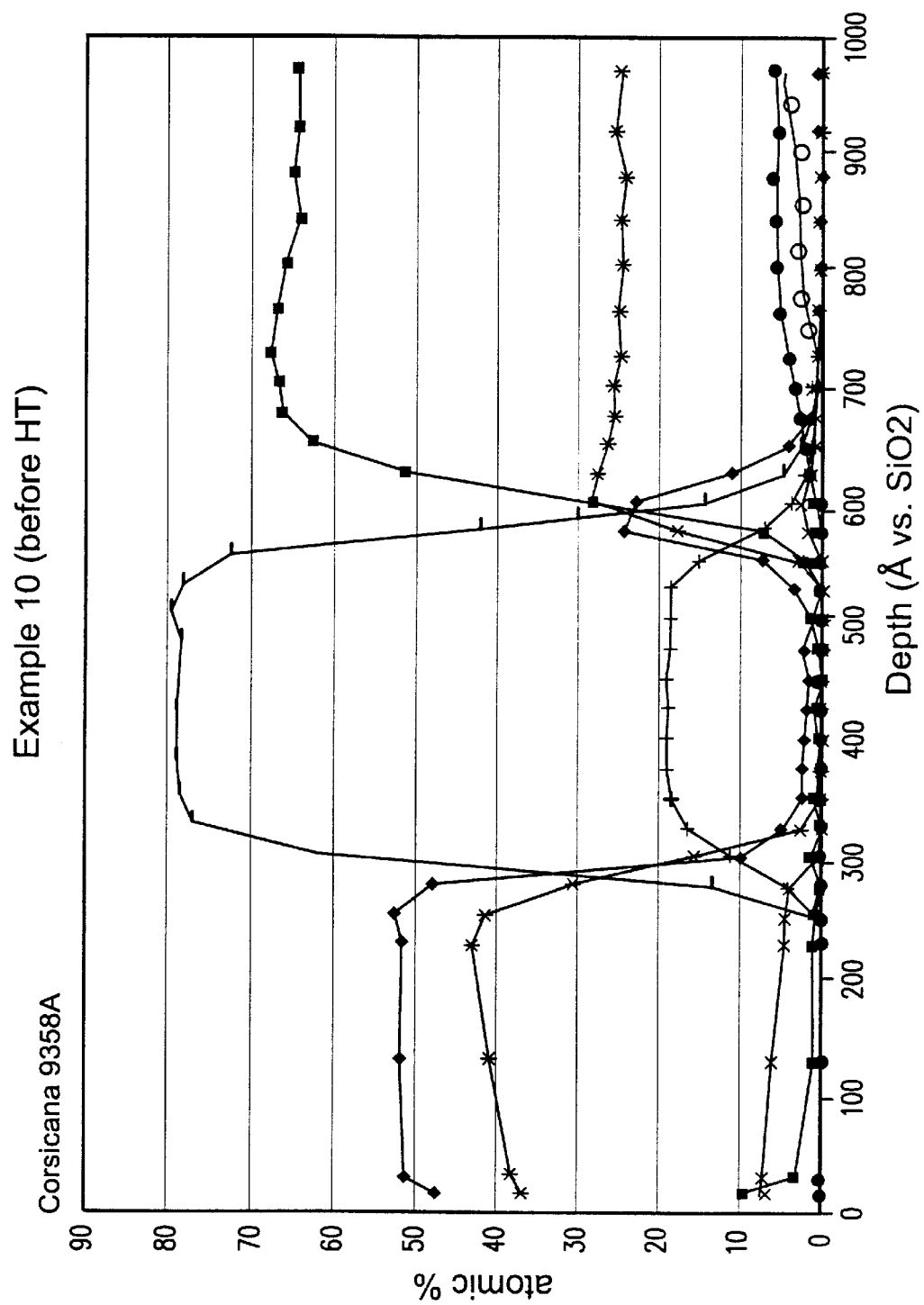

FIG. 21 is an x-ray photoelectron spectroscopy (XPS) graph illustrating the atomic % of components N, O, Na, Al, Si, Ca, Cr, and Ni throughout the thickness of a layer system according to Example 10 of this invention (before heat treatment), where the "depth" axis refers to the depth into the coating and/or substrate from the exterior surface thereof as compared to the depth into a conventional $SiO_2$ layer that would have been achieved over the same period of time.

Figure 22:
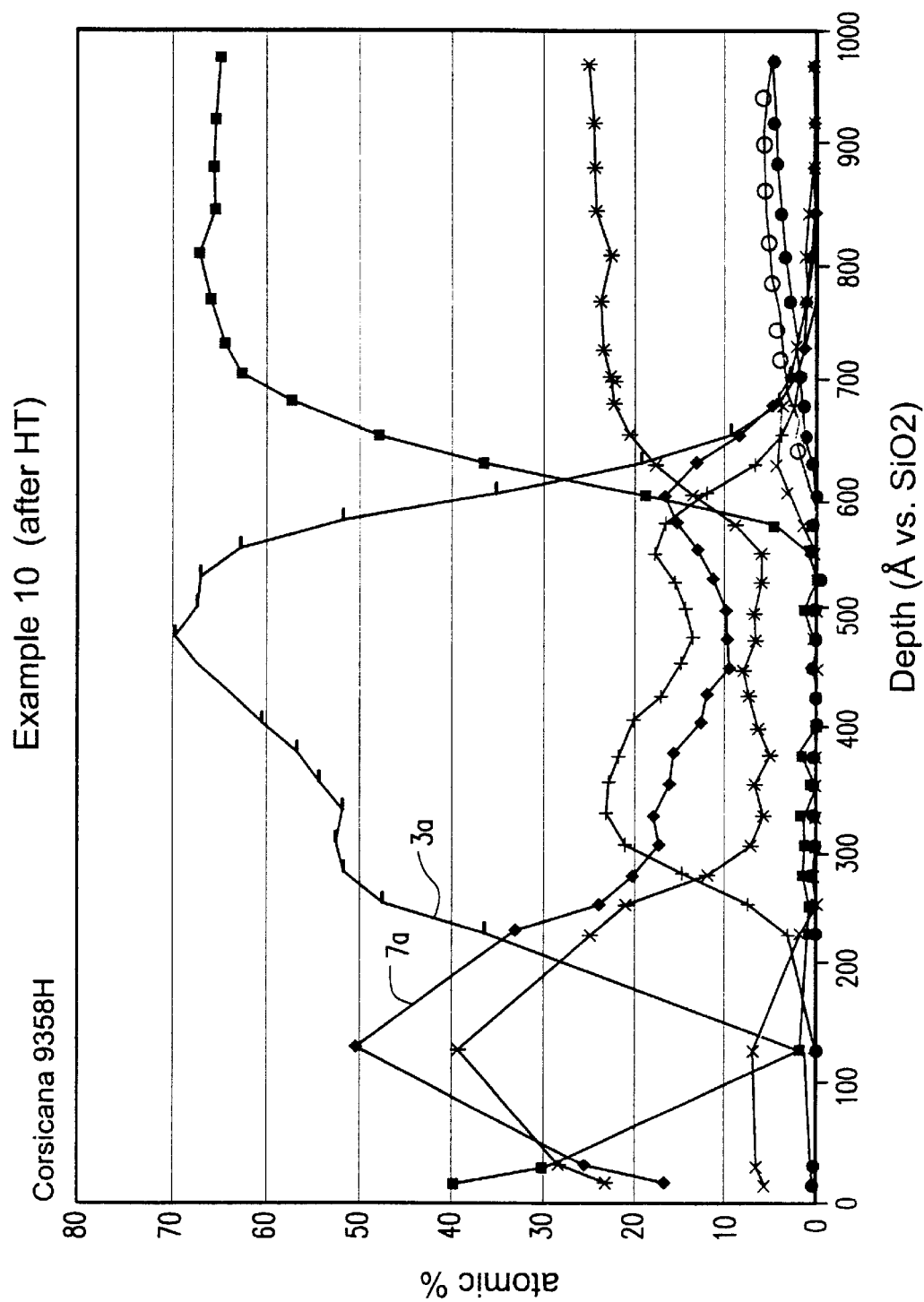

FIG. 22 is an XPS graph illustrating the atomic % of components N, O, Na, Al, Si, Ca, Cr, and Ni throughout the thickness of the layer system according to Example 10 of this invention after heat treatment at 625 degrees C. for 10 minutes.

DETAILED DESCRIPTION OF CERTAIN EXAMPLE EMBODIMENTS OF THE INVENTION

Certain embodiments of this invention provide a coating or layer system that may be used in applications such as IG units, vehicle windows, architectural windows, and/or other suitable applications. Certain embodiments of this invention provide a layer system that has excellent color stability (i.e., a low value of $\Delta E^*$ and/or a low value of $\Delta a^*$; where $\Delta$ is indicative of change in view of HT) with heat treatment (e.g., thermal tempering, bending, or thermal heat strengthening) monolithically and/or in the context of dual pane environments such as IG units or windshields. Such heat treatments often necessitate heating the coated substrate to temperatures from about 600° C. up to about 800° C. for at least about 5 minutes.

Figure 1:
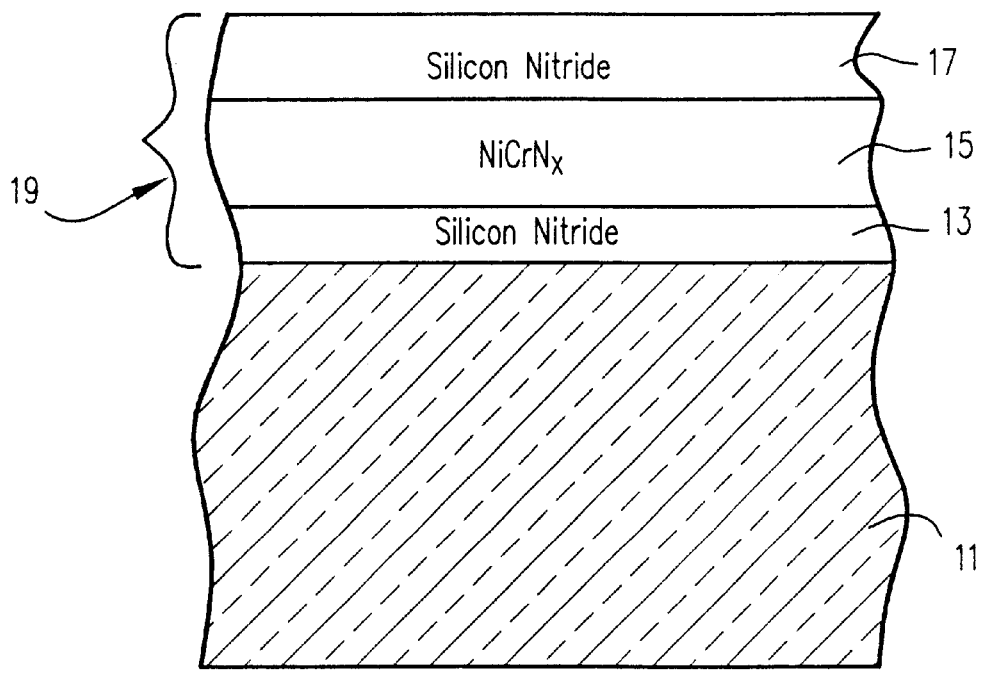
FIG. 1 is a partial side cross sectional view of an embodiment of a coated article (heat treated or not heat treated) according to an example embodiment of this invention.

FIG. 1 is a side cross sectional view of a coated article according to an example embodiment of this invention. The coated article includes substrate 11 (e.g., clear, green, bronze, grey, blue, or blue-green glass substrate from about 1.0 to 12.0 mm thick), optional first dielectric layer 13 (e.g., of or including silicon nitride (e.g., $Si_3N_4$), titanium dioxide, titanium nitride, zirconium nitride, silicon oxynitride, or the like), IR reflecting nickel (Ni) or nickel-chrome inclusive layer 15 that is nitrided (e.g., $NiCrN_x$), and second nitrided dielectric layer 17 (e.g., of or including silicon nitride (e.g., $Si_3N_4$), titanium nitride, zirconium nitride, silicon oxynitride, aluminum nitride, or the like). Thus, the coating system 19 includes metal nitride layer 15 located between (directly or indirectly) a pair of dielectric anti-reflection layers 13 and 17. Underlayer 13 is optional, and upper dielectric layer 17 is preferably at least partially nitrided.

Surprisingly, it has been found that coatings according to this invention can be made more color stable with heat treatment (HT) if layer 15 is nitrided during the deposition process (e.g., the layer is nitrided so as to be deposited as $NiCrN_x$). It is believed that by at least partially nitriding layer 15 during the deposition process (i.e., so that it is nitrided to some significant extent prior to HT), migration of N, Cr, and/or Ni can be reduced during HT thereby enabling the resulting coated article to be more color-stable with HT (i.e., have a lower $\Delta E^*$ value(s)). Metal in metal nitride layer 15 may or may not be fully nitrided in different embodiments of this invention. For example, metal such as Cr in layer 15 may be at least about 40% nitrided in certain embodiments of this invention, more preferably at least about 50% nitrided, even more preferably at least about 60% nitrided, and most preferably at least about 75% nitrided. When layer 15 is $NiCrN_x$, it is believed that the layer includes at least Ni and $CrN_x$. In alternative embodiments of this invention, layer 15 may be an oxynitride layer (e.g., a metal oxynitride). Thus, metal nitride layer 15 may or may not include amounts of oxide in different embodiments of this invention.

In certain preferred embodiments of this invention, dielectric anti-reflection layers 13 and 17 each have an index of refraction less than that of metal nitride layer 15 for anti-reflective purposes (e.g., silicon nitride layers 13 and 17 may have an index of refraction "n" of from about 1.9 to 2.1, while the metal nitride layer 19 has an index "n" higher than that).

Other layer(s) below or above the illustrated coating system 19 may also be provided. Thus, while the layer system 19 is "on" or "supported by" substrate 11 (directly or indirectly), other layer(s) may be provided therebetween. Thus, for example, the layer system 19 of FIG. 1 is considered "on" the substrate 11 even when other layer(s) are provided therebetween.

In embodiments of this invention where layers 13 and 17 comprise silicon nitride (e.g., $Si_3N_4$), sputtering targets including Si employed to form these layers may be admixed with up to 6–20% by weight aluminum or stainless steel (e.g. SS#316), with about this amount then appearing in the layers so formed. Moreover, while layer 15 may be $NiCrN_x$, $NiN_x$, or $CrN_x$ in certain embodiments of this invention, these materials are not limiting and other IR reflecting metal nitrides may instead be used. In $NiCrN_x$ embodiments, any suitable ratio of Ni:Cr may be used. For example, the Ni:Cr ratio in this layer may be 50:50 in certain embodiments, may be 80:20 in other embodiments, and may be 90:10 or any other suitable ratio in still other embodiments.

Figure 2:
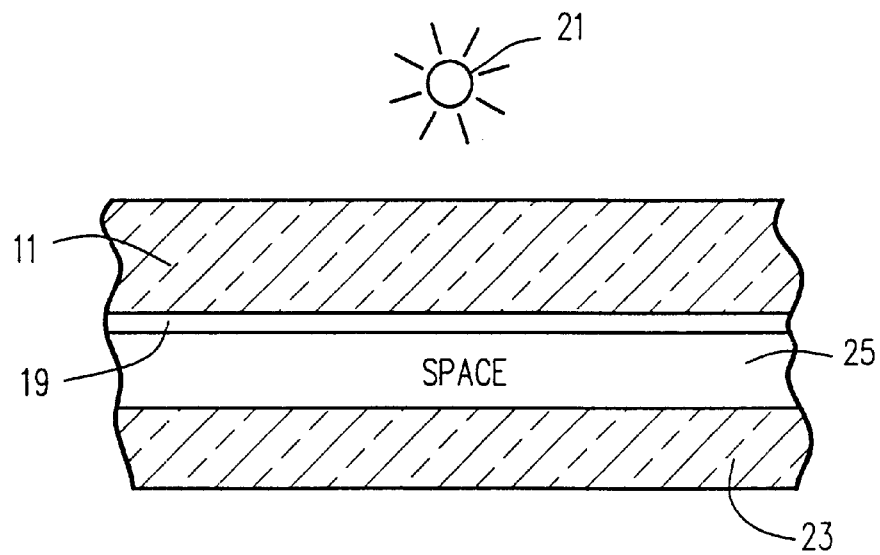
FIG. 2 is a partial cross-sectional view of an IG unit as contemplated by this invention, in which the coating or layer system of FIG. 1 may be used.

FIG. 2 illustrates the coating or layer system 19 of FIG. 1 being utilized on surface #2 of an IG (insulating glass) window unit. In order to differentiate the "inside" of the IG unit from its "outside", the sun 21 is schematically presented on the outside. The IG unit includes outside glass pane or sheet 11 and inside glass pane or sheet 23. These two glass substrates (e.g., float glass 2 mm to 12 mm thick) are sealed at their peripheral edges by a conventional sealant (not shown) and are provided with a conventional desiccant strip (not shown). The panes are then retained in a conventional window or door retaining frame. By sealing the peripheral edges of the glass sheets and replacing the air in insulating space (or chamber) 25 with a gas such as argon, a high insulating value IG unit is formed. Optionally, insulating space 25 may be at a pressure less than atmospheric pressure in certain alternative embodiments, although this of course is not necessary in all IG embodiments. Coating 19 may be provided on the inner wall of substrate 11 in certain embodiments of this invention (as in FIG. 2), and/or on the inner wall of substrate 23 in other embodiments of this invention.

Turning back to FIG. 1, while various thicknesses may be used consistent with one or more of the objects and/or needs discussed herein, according to certain exemplary embodiments of this invention, the preferred thicknesses and materials for the respective layers on the glass substrate 11 are as follows:

TABLE 1

| Layer | (Thicknesses) Preferred Range (Å) | More Preferred (Å) |
| --- | --- | --- |
| $Si_3N_4$ (layer 13) | 30–250 Å | 50–120 Å |
| $NiCrN_x$ (layer 15) | 20–600 Å | 50–350 Å |
| $Si_3N_4$ (layer 17) | 100–500 Å | 210–310 Å |

In certain exemplary embodiments, the color stability with lengthy HT due at least to the nitriding of layer 15 results in substantial matchability between heat-treated and non-heat treated versions of the coating or layer system. In other words, in monolithic and/or IG applications, in certain embodiments of this invention two glass substrates having the same coating system thereon (one HT after deposition and the other not HT) appear to the naked human eye to look substantially the same.

The values $\Delta E^*$ and $\Delta a^*$ are important in determining whether or not there is matchability, or substantial color matchability upon HT, in the context of this invention. Color herein is described by reference to the conventional a*, b* values. The term $\Delta a^*$ is simply indicative of how much color value a* changes due to HT.

The term $\Delta E^*$ (and $\Delta E$) is well understood in the art and is reported, along with various techniques for determining it, in ASTM 2244-93 as well as being reported in Hunter et. al., *The Measurement of Appearance*, 2$^{nd}$ Ed. Cptr. 9, page 162 et seq. [John Wiley & Sons, 1987]. As used in the art, $\Delta E^*$ (and $\Delta E$) is a way of adequately expressing the change (or lack thereof) in reflectance and/or transmittance (and thus color appearance, as well) in an article after or due to HT. $\Delta E$ may be calculated by the "ab" technique, or by the Hunter technique (designated by employing a subscript "H"). $\Delta E$ corresponds to the Hunter Lab L, a, b scale (or $L_h$, $a_h$, $b_h$). Similarly, $\Delta E^*$ corresponds to the CIE LAB Scale L*, a*, b*. Both are deemed useful, and equivalent for the purposes of this invention. For example, as reported in Hunter et. al. referenced above, the rectangular coordinate/scale technique (CIE LAB 1976) known as the L*, a*, b* scale may be used, wherein:

L* is (CIE 1976) lightness units
a* is (CIE 1976) red-green units
b* is (CIE 1976) yellow-blue units and the distance $\Delta E^*$ between $L^*_o a^*_o b^*_o$ and $L^*_1 a^*_1 b^*_1$ is:

$$\Delta E^* = [(\Delta L^*)^2 + (\Delta a^*)^2 + (\Delta b^*)^2]^{1/2} \quad (1)$$

where:

$$\Delta L^* = L^*_1 - L^*_o \quad (2)$$

$$\Delta a^* = a^*_1 - a^*_o \quad (3)$$

$$\Delta b^* = b^*_1 - b^*_o \quad (4)$$

where the subscript "o" represents the coating (or coated article) before heat treatment and the subscript "1" represents the coating (coated article) after heat treatment; and the numbers employed (e.g., a*, b*, L*) are those calculated by the aforesaid (CIE LAB 1976) L*, a*, b* coordinate technique. In a similar manner, $\Delta E$ may be calculated using equation (1) by replacing a*, b*, L* with Hunter Lab values $a_h$, $b_h$, $L_h$. Also within the scope of this invention and the quantification of $\Delta E^*$ are the equivalent numbers if converted to those calculated by any other technique employing the same concept of $\Delta E^*$ as defined above.

In certain example non-limiting embodiments of this invention, coatings or layer systems herein provided on clear monolithic glass substrates have reflective color as follows before heat treatment, as viewed from the glass side of the coated article ($R_G$ %):

TABLE 2a

Glass Side Reflective Color ($R_G$) Before Heat Treatment

|  | General | Preferred |
| --- | --- | --- |
| a* | +2.0 to −8.0 | 0.0 to −2.5 |
| b* | −2.0 to +8.0 | 0.0 to +3.0 |
| L* | 10.0 to 75.0 | 20.0 to 70.3 |

Regarding transmissive color, in certain non-limiting embodiments of this invention, coatings or layer systems herein provided on clear monolithic glass substrates have transmissive color as follows before heat treatment:

TABLE 2b

Transmissive Color Before Heat Treatment

|  | General | Preferred |
|---|---|---|
| a* | 0.0 to −5.0 | 0.0 to −2.0 |
| b* | −2.0 to −15.0 | −3.0 to −9.0 |
| L* | 10.0 to 70.0 | 20.0 to 50.0 |

After heat treatment (HT), in certain embodiments of this invention layer systems-provided on clear monolithic glass substrates have color characteristics ΔE*, and Δa*, and Δb* as follows, when viewed from the glass (G) side (as opposed to the layer side) of the coated article:

TABLE 3a

Reflective Glass Side Color (ΔE*$_G$, Δa*$_G$ & Δb*$_G$ After Heat Treatment

|  | General | Preferred | Most Preferred |
|---|---|---|---|
| ΔE*$_G$ is | <=5.0 | <=4.0 | <=3.0 |
| Δa*$_G$ is | <=1.0 | <=0.6 | <=0.3 |
| Δb*$_G$ is | <=1.1 | <=0.7 | <=0.4 |

As for transmissive color characteristics, after HT in certain embodiments of this invention layer systems provided on clear monolithic glass substrates have transmissive color characteristics ΔE*, Δa* and Δb* as follows:

TABLE 3b

Transmissive Color Characteristics
(ΔE*$_T$ & Δa*$_T$) After HT

|  | General | Preferred | Most Preferred |
|---|---|---|---|
| ΔE*$_T$ is | <=5.0 | <=4.0 | <=3.0 |
| Δa*$_T$ is | <=1.3 | <=1.1 | <=0.8 |
| Δb*$_T$ is | <=6.0 | <=4.0 | <=3.0 |

Accordingly, as shown in Table 3 above, coated articles according to certain embodiments of this invention have a ΔE*$_G$ value (glass side) of no greater than 5.0, more preferably no greater than 4.0, and even more preferably no greater than 3.0; and have a Δa*$_G$ value (glass side) of no greater than about 1.0, more preferably no greater than 0.6 and most preferably no greater than 0.3. Also, in certain example embodiments and as shown in Table 3 above, coated articles according to certain embodiments of this invention have a ΔE*$_T$ value (transmissive) of no greater than 5.0, more preferably no greater than 4.0, and even more preferably no greater than 3.0; and have a Δa*$_T$ value (transmissive) of no greater than about 1.3, more preferably no greater than 1.1, and most preferably no greater than 0.8. When one or more of these are achieved, matchability may result.

EXAMPLES 1–10

The following ten Example coated articles (each ultimately annealed and heat treated) were made, with Examples 1–6 and 8–10 being made in accordance with certain example embodiments of this invention and Example 7 being made for purposes of comparison where the NiCr layer was not nitrided. For Examples 1–6 and 8–10, the layer system on about 6.0 mm thick clear soda-lime-silica glass substrate was: silicon nitride/NiCrN$_x$/silicon nitride (e.g., see FIG. 1). For comparative Example 7, the layer system on about 6.0 mm thick clear soda-lime-silica glass substrate was: silicon nitride/NiCr/silicon nitride (i.e., the NiCr layer was not nitrided in comparative Ex. 7). The coater/process setups for the Examples were as follows.

For each example, a Leybold Terra-G six-chamber sputter coating apparatus was used to sputter the coatings onto the glass substrates. Five cathodes were in each chamber, so there were a total of 30 cathode targets in the sputter coater (not all were used). Cathode numbering utilizes the first digit to refer to the coater chamber, and the second digit to refer to the cathode position in that chamber. For example, cathode #42 was the second cathode (second digit) in the fourth (first digit) sputter chamber. Cathode #s 42, 55 and 61 were dual C-Mag type cathodes; and cathode #s 44 and 45 were planar cathodes. Below, "*" means Al content of approximately 10%. The line speed for Examples 5–10 was 3.5 meters per minute (m/min.), and was about 2.5 m/min. for Examples 1–4. All gas flows in Table 4 (e.g.; Ar and N) are presented in units of sccm. Voltage is measured in terms of volts, and frequency in terms of kHz. Pressure is measured in hPa, and power in kW. T-gas refers to trim gas used to individually adjust gas flows along cathode length to make corrections regarding layer thickness uniformity (all T-gas was at 100 sccm). C% refers to the percentage (%) of trim gas introduced at the center, while PS% refers to the percentage of the trim gas introduced at the pump side, and VS% refers to the percentage of the trim or tuning gas introduced at the viewer side. The NiCr targets were approximately 80/20 NiCr.

Table 4

Coater Setup/Processes for Examples

Example #1

| Cathode | Target | Power | Voltage | Pressure | Ar | N$_2$ | Freq. | T-Gas | C% | PS % | VS % |
|---|---|---|---|---|---|---|---|---|---|---|---|
| #42 | Si/Al* | 11.0 | 192 | 2.11E-03 | 200 | 71.4 | 24.3 | N | 5% | 45% | 50% |
| #44 | Ni/Cr | 38.46 | 411 | 3.15E-03 | 200 | 115.4 | DC | Ar | 80% | 10% | 10% |
| #45 | Ni/Cr | 38.30 | 412 | 2.79E-03 | 200 | 114.9 | DC | Ar | 70% | 20% | 10% |
| #55 | Si/Al* | 44.68 | 308 | 3.40E-03 | 200 | 268.1 | 27.1 | N | 5% | 45% | 50% |
| #61 | Si/Al* | 44.72 | 299 | 3.98E-03 | 202 | 268.3 | 27.2 | N | 5% | 45% | 50% |

Example #2

| Cathode | Target | Power | Voltage | Pressure | Ar | $N_2$ | Freq. | T-Gas | C% | PS % | VS % |
|---|---|---|---|---|---|---|---|---|---|---|---|
| #42 | Si/Al* | 11.0 | 192 | 2.11E-03 | 200 | 71.4 | 24.3 | N | 5% | 45% | 50% |
| #44 | Ni/Cr | 38.46 | 411 | 3.15E-03 | 200 | 153.8 | DC | Ar | 80% | 10% | 10% |
| #45 | Ni/Cr | 38.30 | 412 | 2.79E-03 | 200 | 153.2 | DC | Ar | 70% | 20% | 10% |
| #55 | Si/Al* | 44.68 | 308 | 3.40E-03 | 200 | 268.1 | 27.1 | N | 5% | 45% | 50% |
| #61 | Si/Al* | 44.72 | 299 | 3.98E-03 | 202 | 268.3 | 27.2 | N | 5% | 45% | 50% |

Example #3

| Cathode | Target | Power | Voltage | Pressure | Ar | $N_2$ | Freq. | T-Gas | C% | PS % | VS % |
|---|---|---|---|---|---|---|---|---|---|---|---|
| #42 | Si/Al* | 11.0 | 192 | 2.11E-03 | 200 | 71.4 | 24.3 | N | 5% | 45% | 50% |
| #44 | Ni/Cr | 38.46 | 411 | 3.15E-03 | 200 | 192.3 | DC | Ar | 80% | 10% | 10% |
| #45 | Ni/Cr | 38.30 | 412 | 2.79E-03 | 200 | 191.5 | DC | Ar | 70% | 20% | 10% |
| #55 | Si/Al* | 44.68 | 308 | 3.40E-03 | 200 | 268.1 | 27.1 | N | 5% | 45% | 50% |
| #61 | Si/Al* | 44.72 | 299 | 3.98E-03 | 202 | 268.3 | 27.2 | N | 5% | 45% | 50% |

Example #4

| Cathode | Target | Power | Voltage | Pressure | Ar | $N_2$ | Freq. | T-Gas | C% | PS % | VS % |
|---|---|---|---|---|---|---|---|---|---|---|---|
| #42 | Si/Al* | 11.0 | 192 | 2.11E-03 | 200 | 71.4 | 24.3 | N | 5% | 45% | 50% |
| #44 | Ni/Cr | 38.46 | 411 | 3.15E-03 | 200 | 230.8 | DC | Ar | 80% | 10% | 10% |
| #45 | Ni/Cr | 38.30 | 412 | 2.79E-03 | 200 | 229.8 | DC | Ar | 70% | 20% | 10% |
| #55 | Si/Al* | 44.68 | 308 | 3.40E-03 | 200 | 268.1 | 27.1 | N | 5% | 45% | 50% |
| #61 | Si/Al* | 44.72 | 299 | 3.98E-03 | 202 | 268.3 | 27.2 | N | 5% | 45% | 50% |

Example #5

| Cathode | Target | Power | Voltage | Pressure | Ar | $N_2$ | Freq. | T-Gas | C% | PS % | VS % |
|---|---|---|---|---|---|---|---|---|---|---|---|
| #42 | Si/Al* | 11.0 | 192 | 2.11E-03 | 200 | 71.4 | 24.3 | N | 5% | 45% | 50% |
| #44 | Ni/Cr | 38.46 | 411 | 3.15E-03 | 200 | 51.9 | DC | Ar | 80% | 10% | 10% |
| #45 | Ni/Cr | 38.30 | 412 | 2.79E-03 | 200 | 51.7 | DC | Ar | 70% | 20% | 10% |
| #55 | Si/Al* | 44.68 | 308 | 3.40E-03 | 200 | 268.1 | 27.1 | N | 5% | 45% | 50% |
| #61 | Si/Al* | 44.72 | 299 | 3.98E-03 | 202 | 268.3 | 7.2 | N | 5% | 45% | 50% |

Example #6

| Cathode | Target | Power | Voltage | Pressure | Ar | $N_2$ | Freq. | T-Gas | C% | PS % | VS % |
|---|---|---|---|---|---|---|---|---|---|---|---|
| #42 | Si/Al* | 11.0 | 192 | 2.11E-03 | 200 | 71.4 | 24.3 | N | 5% | 45% | 50% |
| #44 | Ni/Cr | 38.46 | 411 | 3.15E-03 | 200 | 31.2 | DC | Ar | 80% | 10% | 10% |
| #45 | Ni/Cr | 38.30 | 412 | 2.79E-03 | 200 | 31.0 | DC | Ar | 70% | 20% | 10% |
| #55 | Si/Al* | 44.68 | 308 | 3.40E-03 | 200 | 268.1 | 27.1 | N | 5% | 45% | 50% |
| #61 | Si/Al* | 44.72 | 299 | 3.98E-03 | 202 | 268.3 | 27.2 | N | 5% | 45% | 50% |

Example #7 (Comparative Example)

| Cathode | Target | Power | Voltage | Pressure | Ar | $N_2$ | Freq. | T-Gas | C% | PS % | VS % |
|---|---|---|---|---|---|---|---|---|---|---|---|
| #42 | Si/Al* | 11.0 | 192 | 2.11E-03 | 200 | 71.4 | 24.3 | N | 5% | 45% | 50% |
| #44 | Ni/Cr | 38.46 | 411 | 3.15E-03 | 200 | 0 | DC | Ar | 80% | 10% | 10% |
| #45 | Ni/Cr | 38.30 | 412 | 2.79E-03 | 200 | 0 | C | Ar | 70% | 20% | 10% |
| #55 | Si/Al* | 44.68 | 308 | 3.40E-03 | 200 | 268.1 | 27.1 | N | 5% | 45% | 50% |
| #61 | Si/Al* | 44.72 | 299 | 3.98E-03 | 202 | 268.3 | 27.2 | N | 5% | 45% | 50% |

Example #8

| Cathode | Target | Power | Voltage | Pressure | Ar | $N_2$ | Freq. | T-Gas | C% | PS % | VS % |
|---|---|---|---|---|---|---|---|---|---|---|---|
| #42 | Si/Al* | 11.0 | 192 | 2.11E-03 | 200 | 71.4 | 24.3 | N | 5% | 45% | 50% |
| #44 | Ni/Cr | 38.46 | 411 | 3.15E-03 | 200 | 36.5 | DC | Ar | 80% | 10% | 10% |
| #45 | Ni/Cr | 38.30 | 412 | 2.79E-03 | 200 | 36.4 | DC | Ar | 70% | 20% | 10% |
| #55 | Si/Al* | 44.68 | 308 | 3.40E-03 | 200 | 312.8 | 27.1 | N | 5% | 45% | 50% |
| #61 | Si/Al* | 44.72 | 299 | 3.98E-03 | 202 | 313.0 | 27.2 | N | 5% | 45% | 50% |

Example #9

| Cathode | Target | Power | Voltage | Pressure | Ar | $N_2$ | Freq. | T-Gas | C% | PS % | VS % |
|---|---|---|---|---|---|---|---|---|---|---|---|
| #42 | Si/Al* | 11.0 | 192 | 2.11E-03 | 200 | 71.4 | 24.3 | N | 5% | 45% | 50% |
| #44 | Ni/Cr | 38.46 | 411 | 3.15E-03 | 200 | 36.5 | DC | Ar | 80% | 10% | 10% |
| #45 | Ni/Cr | 38.30 | 412 | 2.79E-03 | 200 | 36.4 | DC | Ar | 70% | 20% | 10% |
| #55 | Si/Al* | 44.68 | 308 | 3.40E-03 | 200 | 223.4 | 27.1 | N | 5% | 45% | 50% |
| #61 | Si/Al* | 44.72 | 299 | 3.98E-03 | 202 | 223.6 | 27.2 | N | 5% | 45% | 50% |

Example #10

| Cathode | Target | Power | Voltage | Pressure | Ar | $N_2$ | Freq. | T-Gas | C% | PS % | VS % |
|---|---|---|---|---|---|---|---|---|---|---|---|
| #42 | Si/Al* | 11.0 | 192 | 2.11E-03 | 200 | 71.4 | 24.3 | N | 5% | 45% | 50% |
| #44 | Ni/Cr | 38.46 | 411 | 3.15E-03 | 200 | 36.5 | DC | Ar | 80% | 10% | 10% |
| #45 | Ni/Cr | 38.30 | 412 | 2.79E-03 | 200 | 36.4 | DC | Ar | 70% | 20% | 10% |
| #55 | Si/Al* | 44.68 | 308 | 3.40E-03 | 200 | 178.7 | 27.1 | N | 5% | 45% | 50% |
| #61 | Si/Al* | 44.72 | 299 | 3.98E-03 | 202 | 178.9 | 27.2 | N | 5% | 45% | 50% |

As can be seen above, Examples 1–6 and 8–10 were all deposited on respective glass substrates in a manner so that layer 15 (i.e., the $NiCrN_x$) layer was nitrided as deposited (due to intentional introduction of N gas into the sputter chamber including cathode(s) #s 44 and 45). However, in comparative Example 7 layer 15 (NiCr) was not nitrided, in order to illustrate the benefits of nitriding layer 15 according to this invention. Examples 1–6 and 8–10 illustrate that layer 15 can be nitrided (via cathodes/targets 44–45) to various degrees (i.e., the nitrogen (N) flow ranged from 31 sccm in Example 6 up to about 230 sccm in Example 4). It will be shown below that each of these had better characteristics with regard to color stability upon HT than comparative Example 7 where no nitriding was done to the NiCr layer. Generally, the more nitriding of layer 15, the lower the $\Delta E$ value and thus the better the color stability upon HT. Moreover, it can be seen that Examples 9–10 each had a Si-rich overcoat silicon nitride layer relative to the other Examples. Examples 8–10 show the effect of N gas flow (mL/kW) on coating stability; e.g., the higher the N gas flow, the less Ni migration and more color stability with HT. While Si-rich overcoat silicon nitride layers 17 are appropriate according to certain embodiments of this invention, it will be shown below that the Si-rich nature of the overcoat 17 tends to cause sheet resistance ($R_s$) to increase upon HT which is sometimes not desirable. Thus, it can be seen that by increasing N gas flow for layer 15, Ni diffusion/migration into the upper silicon nitride layer can be reduced and/or prevented in order to provide a coating with more color stability upon HT.

After being sputtered onto glass substrates as set forth above, Examples 1–10 were tested and were found to have the following characteristics monolithically (not in an IG unit), where the heat treatment (HT) involved heating the respective monolithic products at about 625 degrees C. for about 10 minutes. It is noted that a* and b* color coordinate values are in accordance with CIE LAB 1976, Ill. C 2 degree observer technique, $\Delta a^*$ and $\Delta b^*$ are in terms of absolute value. Moreover, sheet resistance ($R_s$) is in units of ohms per square as is known in the art.

Table 5

Characteristics of Examples 1–10 (Monolithic: Before/After HT)

Examples 1–2

| Value/Measurement | Ex. 1 (pre-HT) | Ex. 1 (post-HT) | Ex. 2 (pre-HT) | Ex 2 (post-HT) |
|---|---|---|---|---|
| Transmission (TY) % | 9.83 | 10.57 | 10.58 | 11.13 |
| $L^*_T$ | 37.54 | 38.85 | 38.87 | 39.79 |
| $a^*_T$ | −0.42 | −0.69 | −0.59 | −0.66 |
| $b^*_T$ | −7.04 | −3.81 | −6.72 | −4.35 |
| $\Delta a^*_T$ (transmissive) | | 0.27 | | 0.07 |
| $\Delta E^*_T$ (transmissive) | | 3.5 | | 2.5 |
| Glass side | | | | |
| Reflectance ($R_G Y$ %) | 40.29 | 36.45 | 39.62 | 35.66 |
| $L^*_G$ | 69.68 | 66.86 | 69.19 | 66.26 |
| $a^*_G$ | −1.71 | −1.80 | −1.68 | −1.72 |
| $b^*_G$ | 2.26 | 1.88 | 1.84 | 1.61 |
| $\Delta a^*_G$ (glass side) | | 0.09 | | 0.04 |
| $\Delta E^*_G$ (glass side) | | 2.8 | | 2.9 |
| $\Delta b^*_G$ | | 0.38 | | 0.23 |
| Film side | | | | |
| Reflectance ($R_F Y$ %) | 35.13 | 35.02 | 32.77 | 34.61 |
| $L^*_F$ | 65.85 | 65.76 | 63.98 | 65.44 |
| $a^*_F$ | 0.05 | 0.04 | 0.32 | −0.01 |
| $b^*_F$ | 20.91 | 15.31 | 22.32 | 16.28 |
| $R_s$ (ohms/sq.) | n/a | n/a | n/a | n/a |

Examples 3–4

| Value/Measurement | Ex. 3 (pre-HT) | Ex. 3 (post-HT) | Ex. 4 (pre-HT) | Ex 4 (post-HT) |
|---|---|---|---|---|
| Transmission (TY) % | 10.66 | 11.26 | 10.58 | 11.42 |
| $L^*_T$ | 39.0 | 40.01 | n/a | n/a |
| $a^*_T$ | −0.7 | −0.69 | n/a | n/a |
| $b^*_T$ | −6.07 | −4.78 | n/a | n/a |
| $\Delta a^*_T$ (transmissive) | | 0.01 | | n/a |
| $\Delta E^*_T$ (transmissive) | | 1.6 | | n/a |
| Glass side | | | | |
| Reflectance ($R_G Y$ %) | 39.3 | 35.33 | 38.69 | 35.71 |
| $L^*_G$ | 68.97 | 66.0 | 68.52 | 66.29 |
| $a^*_G$ | −1.71 | −1.64 | −1.68 | −1.58 |
| $b^*_G$ | 1.72 | 1.47 | 1.74 | 1.47 |
| $\Delta a^*_G$ (glass side) | | 0.07 | | 0.10 |
| $\Delta E^*_G$ (glass side) | | 3.0 | | 2.2 |
| $\Delta b^*_G$ (glass side) | | 0.25 | | 0.27 |
| Film side | | | | |
| Reflectance ($R_F Y$ %) | 32.71 | 34.29 | 33.73 | 33.92 |
| $L^*_F$ | 63.93 | 65.19 | 64.75 | 64.9 |
| $a^*_F$ | 0.3 | −0.03 | 0.15 | 0.03 |
| $b^*_F$ | 21.58 | 17.58 | 19.93 | 17.86 |
| $R_s$ (ohms/sq.) | n/a | n/a | n/a | n/a |

Examples 5–6

| Value/Measurement | Ex. 5 (pre-HT) | Ex. 5 (post-HT) | Ex. 6 (pre-HT) | Ex 6 (post-HT) |
|---|---|---|---|---|
| Transmission (TY) % | 10.48 | 11.54 | 9.5 | 10.68 |
| $L^*_T$ | 38.69 | 40.48 | n/a | 39.03 |
| $a^*_T$ | −0.45 | −0.96 | n/a | −1.32 |
| $b^*_T$ | −7.78 | −3.61 | n/a | −3.63 |
| $\Delta a^*_T$ (transmissive) | | 0.51 | | n/a |
| $\Delta E^*_T$ (transmissive) | | 4.6 | | n/a |
| Glass side | | | | |
| Reflectance ($R_G Y$ %) | 39.58 | 35.39 | 40.8 | 36.29 |
| $L^*_G$ | 69.17 | 66.05 | 70.0 | 66.74 |
| $a^*_G$ | −1.93 | −1.98 | −2.0 | −1.8 |
| $b^*_G$ | 1.46 | 0.72 | 1.9 | 1.15 |
| $\Delta a^*_G$ (glass side) | | 0.05 | | 0.20 |
| $\Delta E^*_G$ (glass side) | | 3.2 | | 3.4 |
| $\Delta b^*_G$ (glass side) | | 0.74 | | 0.75 |
| Film side | | | | |
| Reflectance ($R_F Y$ %) | 33.39 | 32.32 | 35.3 | 33.4 |
| $L^*_F$ | 64.47 | 63.61 | 66 | 64.48 |
| $a^*_F$ | 0.07 | 0.24 | −0.1 | 0.52 |
| $b^*_F$ | 22.23 | 15.26 | 21.6 | 14.96 |
| $R_s$ (ohms/sq.) | 41.4 | 36.0 | 40.4 | 39.5 |

Examples 7–8

(Ex. 7 Provided for Purposes of Comparison to Other Examples)

| Value/Measurement | Ex. 7 (pre-HT) | Ex. 7 (post-HT) | Ex. 8 (pre-HT) | Ex 8 (post-HT) |
|---|---|---|---|---|
| Transmission (TY) % | 8.02 | 9.71 | 9.87 | 11.37 |
| $L^*_T$ | 34.02 | 37.32 | 37.61 | 40.2 |
| $a^*_T$ | 0.03 | −1.5 | −0.28 | −0.92 |
| $b^*_T$ | −8.21 | −3.52 | −7.61 | −3.14 |
| $\Delta a^*_T$ (transmissive) | | 1.53 | | 0.64 |
| $\Delta E^*_T$ (transmissive) | | 5.9 | | 5.2 |
| Glass side | | | | |
| Reflectance ($R_G Y$ %) | 43.58 | 38.41 | 40.19 | 35.52 |
| $L^*_G$ | n/a | 71.94 | 69.61 | 66.15 |
| $a^*_G$ | n/a | −2.06 | −1.89 | −1.91 |
| $b^*_G$ | n/a | 2.18 | 1.85 | 0.8 |
| $\Delta a^*_G$ (glass side) | | n/a | | 0.02 |
| $\Delta E^*_G$ (glass side) | | n/a | | 3.6 |
| $\Delta b^*_G$ (glass side) | | n/a | | 1.05 |
| Film side | | | | |
| Reflectance ($R_F Y$ %) | 38 | 30.1 | 35.72 | 33.22 |
| $L^*_F$ | 68.02 | 61.74 | 66.31 | 64.34 |
| $a^*_F$ | −0.32 | 1.12 | −0.15 | 0.21 |
| $b^*_F$ | 21.0 | 18.65 | 20.13 | 13.68 |
| $R_s$ (ohms/sq.) | 38.8 | 41.9 | 41.4 | 34.5 |

Examples 9–10

| Value/Measurement | Ex. 9 (pre-HT) | Ex. 9 (post-HT) | Ex. 10 (pre-HT) | Ex. 10 (post-HT) |
|---|---|---|---|---|
| Transmission (TY) % | 9.74 | 11.05 | 9.41 | 10.08 |
| $L^*_T$ | 37.36 | 39.67 | 36.76 | 37.98 |
| $a^*_T$ | −0.25 | −1.2 | −0.42 | −1.52 |
| $b^*_T$ | −7.9 | −3.78 | −7.29 | −3.2 |

-continued

| Value/Measurement | Ex. 9 (pre-HT) | Ex. 9 (post-HT) | Ex. 10 (pre-HT) | Ex. 10 (post-HT) |
|---|---|---|---|---|
| $\Delta a^*_T$ (transmissive) | | 0.95 | | 1.10 |
| $\Delta E^*_T$ (transmissive) | | 4.8 | | 4.4 |
| Glass side | | | | |
| Reflectance ($R_G Y$ %) | 40.34 | 35.69 | 40.2 | 35.35 |
| $L^*_G$ | 69.71 | 66.29 | 69.61 | 66.02 |
| $a^*_G$ | −1.86 | −1.63 | −1.79 | −1.33 |
| $b^*_G$ | 1.89 | 0.99 | 1.76 | 1.61 |
| $\Delta a^*_G$ (glass side) | | 0.23 | | 0.46 |
| $\Delta E^*_G$ (glass side) | | 3.5 | | 3.6 |
| $\Delta b^*_G$ (glass side) | | 0.90 | | 0.15 |
| Film side | | | | |
| Reflectance ($R_F Y$ %) | 35.91 | 33.57 | 37.27 | 37.22 |
| $L^*_F$ | 66.45 | 64.62 | 67.48 | 67.44 |
| $a^*_F$ | −0.21 | 0.41 | −0.54 | 0.6 |
| $b^*_F$ | 20.6 | 15.14 | 20.61 | 11.42 |
| $R_s$ (ohms/sq.) | 40.7 | 39.8 | 41 | 47 |

As can be seen from the above, each of Examples 1–6 and 8–10 had good matchability (i.e., transmissive and/or glass side reflective $\Delta E^*$ no greater than 5.0) because layer 15 was nitrided. However, in Example 7 where layer 15 was not nitrided, bad matchability and thus significant color shift with HT resulted (i.e., $\Delta E_T$ was very high in Ex. 7 at 5.9). For the other Examples where nitriding of layer 15 was done, $\Delta E^*$ was no greater than 5.0, more preferably no greater than 4.0 and in certain most preferred instances no greater than 3.0. Meanwhile, it can also be seen that Example 7 experienced a very high $\Delta a^*$ value of 1.53. In contrast, in the other Examples where nitriding of layer 15 was conducted according to this invention the $\Delta a^*$ values were much lower thereby illustrating significantly more color stability upon HT. Accordingly, it can clearly be seen that nitriding of layer 15 according to certain embodiments of this invention enables the resulting coated article to have much improved color stability upon lengthy HT (e.g., HT of at least 5 minutes).

For purposes of illustrating how certain color stability numbers were calculated above, consider Example 3 which had the following transmissive values:

| | | |
|---|---|---|
| L* (before HT): 39.0; | L* (after HT): 40.01; | $\Delta L^*$ = 1.01 |
| a* (before HT): −0.70; | a* (after HT): −0.69 | $\Delta a^*$ = 0.01 |
| b* (before HT): −6.07; | b* (after HT): −4.78 | $\Delta b^*$ = 1.29 |

Thus, using the equation $\Delta E^* = [(\Delta L^*)^2 + (\Delta a^*)^2 + (\Delta b^*)^2]^{1/2}$, (i.e., equation (1) above), it can be determined that $[(1.01)^2 + (0.01)^2 + (1.29)^2]^{1/2} = (2.6843)^{1/2} = 1.6 = \Delta E^*_T$. This relatively low transmissive $\Delta E^*$ value indicates good matchability (before versus after heat treatment), and is much better (i.e., much lower) than the 5.9 value for Example 7.

FIGS. 3–4 are XPS plots of Example 1, before and after HT, respectively. In a similar manner, FIGS. 5–6 are XPS plots of Example 2 before and after HT, respectively; FIGS. 7–8 are XPS plots of Example 3 before and after HT, respectively; FIGS. 9–10 are XPS plots of Example 4 before and after HT, respectively; FIGS. 11–12 are XPS plots of Example 5 before and after HT, respectively; FIGS. 13–14 are XPS plots of Example 6 before and after HT, respectively; FIGS. 15–16 are XPS plots of Example 7 before and after HT, respectively; FIGS. 17–18 are XPS plots of Example 8 before and after HT, respectively; FIGS. 19–20 are XPS plots of Example 9 before and after HT, respectively; and FIGS. 21–22 are XPS plots of Example 10 before and after HT, respectively. As will be appreciated by those skilled in the art, the nitrogen (N) signals reported in these Figures are taken from the 1s orbital of N as shown, and so forth. It is noted that the interface of the coating system with the underlying glass substrate can be seen in these FIGS. where Ca and Na begin to rise (e.g., around 750 Å in FIGS. 3–4).

By comparing FIGS. 15–16 (comparative Example 7) with the XPS plots for other examples, it can be seen that when layer 15 is significantly nitrided there is significantly less migration of nitrogen (N) from the upper silicon nitride layer into the NiCr inclusive layer upon HT (as compared to FIG. 16). This is illustrated, for example, by the fact that the N slope 7a on the lower side of layer 17 is much more steep in FIGS. 4, 6, 8, 10, 12, 14, 18 and 20 (after HT) than in FIG. 16. Moreover, it can be seen in these same FIGS. that the Ni slope 3a at the upper side of layer 15 is much more steep in FIGS. 4, 6, 8, 10, 12, 14, 18 and 20 than in FIG. 16; thereby indicating that according to certain embodiments of this invention there is much less Ni migration out of layer 15 upon lengthy HT as compared to Example 7. Reduction in such migrations enables $\Delta E$ values to be reduced, thereby permitting better color stability upon lengthy HT according to this invention.

In Table 5 above, it can also be seen that in comparative Example 7 the sheet resistance ($R_s$) increased upon HT (this is not desirable in certain instances). This increase in sheet resistance in Example 7 is believed to at least partially result from the Ni migrating from layer 15 into layer 17 upon HT as shown in FIG. 16. Thus, another surprising advantage associated with certain example embodiments of this invention is that sheet resistance decreases upon HT (e.g., see Examples 5, 6, 8 and 9 above). This can be explained by at least the fact that the Ni slope 3a is much more steep at the upper side of layer 15 in FIGS. 4, 6, 8, 10, 12, 14, 18 and 20 than in FIG. 16. However, it is noted that while layer 17 may be a Si-rich form of silicon nitride in certain embodiments of this invention, this may cause significant Ni migration thereby causing sheet resistance to rise upon HT as shown in Example 10 (note the less steep Ni slope 3a in FIG. 22, and the increase in $R_s$, upon HT in Table 5). Thus, increasing nitrogen (N) gas flow proximate the cathode target(s) which form the upper silicon nitride layer enables production of a coated glass article which will more likely experience a decrease in sheet resistance upon HT.

In certain embodiments of this invention, coated articles have a sheet resistance ($R_s$) of no greater than 500 ohms/sq. after HT, more preferably no greater than 250 ohms/sq. after HT, even more preferably no greater than about 100 ohms/sq., and most preferably no greater than about 41 ohms/sq. after HT. Moreover, in certain preferred embodiments of this invention, coated articles herein experience a reduction in sheet resistance upon HT (in contrast to Example 7). Coated articles herein in certain example embodiments also have a hemispherical emissivity ($E_h$) of no greater than about 1.0, more preferably no greater than about 0.5, and most preferably no greater than about 0.4 before and/or after HT.

Another surprising result of certain example embodiments of this invention is that nitriding layer 15 results in a more mechanically durable (e.g., scratch resistant) coated article after HT. This is believed to be because or the chrome nitride present in layer 15. Coated articles of certain embodiments of this invention are both chemically and mechanically durable. Additionally, monolithic coated articles according to certain embodiments of this invention preferably have a visible transmittance (TY%) of from 5–80% (more preferably from 7–20%) before and/or after HT. Additionally, monolithic coated articles according to certain embodiments of this invention preferably have a glass side reflectance value ($R_G Y$ %) of at least 15%, and more preferably from 20–42% before and/or after HT.

The aforesaid characteristics may be measured at a clear float glass nominal substrate thickness of about 6 mm, or any other suitable substrate thickness from 1–12 mm. Moreover, it is noted that the units of Examples 1–6 and 8–10 may ultimately be utilized in the context of an IG unit, a vehicle window, or the like.

Certain terms are prevalently used in the glass coating art, particularly when defining the properties and solar management characteristics of coated glass.

Such terms are used herein in accordance with their well known meaning. For example, as used herein:

Intensity of reflected visible wavelength light, i.e. "reflectance" is defined by its percentage and is reported as $R_x Y$ (i.e. the Y value cited below in ASTM E-308-85), wherein "X" is either "G" for glass side or "F" for film side. "Glass side" (e.g. "G") means, as viewed from the side of the glass substrate opposite that on which the coating resides, while "film side" (i.e. "F") means, as viewed from the side of the glass substrate on which the coating resides.

Color characteristics are measured and reported herein using the CIE LAB a*, b* coordinates and scale (i.e. the CIE a*b* diagram, Ill. CIE-C, 2 degree observer). Other similar coordinates may be equivalently used such as by the subscript "h" to signify the conventional use of the Hunter Lab Scale, or Ill. CIE-C, 10° observer, or the CIE LUV u*v* coordinates. These scales are defined herein according to ASTM D-2244-93 "Standard Test Method for Calculation of Color Differences From Instrumentally Measured Color Coordinates" Sep. 15, 1993 as augmented by ASTM E-308-85, Annual Book of ASTM Standards, Vol. 06.01 "Standard Method for Computing the Colors of Objects by 10 Using the CIE System" and/or as reported in IES LIGHTING HANDBOOK 1981 Reference Volume.

The terms "emittance" and "transmittance" are well understood in the art and are used herein according to their well known meaning. Thus, for example, the term "transmittance" means solar transmittance, which is made up of visible light transmittance (TY), infrared radiation transmittance, and ultraviolet radiation transmittance. Total solar energy transmittance (TS) is then usually characterized as a weighted average of these other values. With respect to these transmittances, visible transmittance (TY), as reported herein, is characterized by the standard CIE Illuminant C, 2 degree observer, technique at 380–720 nm; near-infrared is 720–2500 nm; ultraviolet is 300–800 nm; and total solar is 300–2500 nm. For purposes of emittance, however, a particular infrared range (i.e. 2,500–40,000 nm) is employed.

Visible transmittance can be measured using known, conventional techniques. For example, by using a spectrophotometer, such as a Perkin Elmer Lambda 900 or Hitachi U4001, a spectral curve of transmission is obtained. Visible transmission is then calculated using the aforesaid ASTM 308/2244-93 methodology. A lesser number of wavelength points may be employed than prescribed, if desired. Another technique for measuring visible transmittance is to employ a spectrometer such as a commercially available Spectrogard spectrophotometer manufactured by Pacific Scientific Corporation. This device measures and reports visible transmittance directly. As reported and measured herein, visible transmittance (i.e. the Y value in the CIE tristimulus system, ASTM E-308-85) uses the Ill. C.,2 degree observer.

"Emittance" (E) is a measure, or characteristic of both absorption and reflectance of light at given wavelengths. When transmittance is zero, which is approximately the case for float glass with wavelengths longer than 2500 nm, the emittance may be represented by the formula:

$$E = 1 - \text{Reflectance}_{film}$$

For architectural purposes, emittance values become quite important in the so-called "mid-range", sometimes also called the "far range" of the infrared spectrum, i.e. about 2,500–40,000 nm., for example, as specified by the WINDOW 4.1 program, LBL-35298 (1994) by Lawrence Berkeley Laboratories, as referenced below. The term "emittance" as used herein, is thus used to refer to emittance values measured in this infrared range as specified by ASTM Standard E 1585-93 for measuring infrared energy to calculate emittance, entitled "Standard Test Method for Measuring and Calculating Emittance of Architectural Flat Glass Products Using Radiometric Measurements". This Standard, and its provisions, are incorporated herein by reference. In this Standard, emittance is reported as hemispherical emittance ($E_h$) and normal emittance ($E_n$). The actual accumulation of data for measurement of such emittance values is conventional and may be done by using, for example, a Beckman Model 4260 spectrophotometer with "VW" attachment (Beckman Scientific Inst. Corp.). This spectrophotometer measures reflectance versus wavelength, and from this, emittance is calculated using the aforesaid ASTM E 1585-93 which has been incorporated herein by reference.

Another term employed herein is "sheet resistance". Sheet resistance ($R_s$) is a well known term in the art and is used herein in accordance with its well known meaning. It is here reported in ohms per square units. Generally speaking, this term refers to the resistance in ohms for any square of a layer system on a glass substrate to an electric current passed through the layer system. Sheet resistance is an indication of how well the layer or layer system is reflecting infrared energy, and is thus often used along with emittance as a measure of this characteristic. "Sheet resistance" may for example be conveniently measured by using a 4-point probe ohmmeter, such as a dispensable 4-point resistivity probe with a Magnetron Instruments Corp. head, Model M-800 produced by Signatone Corp. of Santa Clara, Calif.

"Chemical durability" or "chemically durable" is used herein synonymously with the term of art "chemically resistant" or "chemical stability". Chemical durability is determined by boiling a 2"×5" sample of a coated glass substrate in about 500 cc of 5% HCl for one hour (i.e. at about 220° F.). The sample is deemed to pass this test (and thus the layer system is "chemically resistant" or is deemed to be "chemically durable" or to have "chemical durability") if the sample's layer system shows no visible discoloration or visible peeling, and no pinholes greater than about 0.003" in diameter after this one hour boil.

"Mechanical durability" as used herein is defined by the following tests. The test uses a Pacific Scientific Abrasion Tester (or equivalent) wherein a 2"×4"×1" nylon brush is cyclically passed over the layer system in 500 cycles employing 150 gm of weight, applied to a 6"×17" sample. In this test, if no substantial, noticeable scratches appear when viewed with the naked eye under visible light, the test is deemed passed, and the article is said to be "mechanically durable" or to have "mechanical durability".

The terms "heat treatment" and "heat treating" as used herein mean heating the article to a temperature sufficient to enabling thermal tempering, bending, or heat strengthening of the glass inclusive article. This definition includes, for example, heating a coated article to a temperature of at least about 600 degrees C. for a sufficient period to enable tempering.

Once given the above disclosure many other features, modifications and improvements will become apparent to the skilled artisan. Such other features, modifications and improvements are therefore considered to be a part of this invention, the scope of which is to be determined by the following claims:

What is claimed is:

1. A heat treated coated article comprising:

a layer system supported by a glass substrate, said layer system comprising a metal nitride inclusive layer located between first and second dielectric layers, wherein the second dielectric layer is at least partially nitrided and positioned so that the metal nitride inclusive layer is between the second dielectric layer and the glass substrate; and wherein said coated article has a transmissive $\Delta E^*_T$ value no greater than 5.0 after at least about 5 minutes of heat treatment at a temperature(s) of at least about 600 degrees C.

2. The coated article of claim 1, wherein said coated article has a transmissive $\Delta E^*_T$ value no greater than 4.0 after said heat treatment.

3. The coated article of claim 1, wherein said coated article has a transmissive $\Delta E^*_T$ value no greater than 3.0 after said heat treatment, and wherein the coated article has a transmissive a* color value that is negative both before and after said heat treatment.

4. The coated article of claim 1, wherein said coated article has a transmissive $\Delta a^*$ value no greater than 1.3 following said heat treatment.

5. The coated article of claim 4, wherein said coated article has a transmissive $\Delta a^*$ value no greater than 1.1 following said heat treatment.

6. The coated article of claim 5, wherein said coated article has a transmissive $\Delta a^*$ value no greater than 0.8 following said heat treatment.

7. The coated article of claim 1, wherein the coated article has a transmissive a* color value that is negative both before and after said heat treatment.

8. The coated article of claim 1, wherein said metal nitride inclusive layer comprises $NiCrN_x$.

9. The coated article of claim 8, wherein said second dielectric layer comprises silicon nitride.

10. The coated article of claim 1, wherein said first dielectric layer comprises silicon nitride and is from 30–250 Å thick, said metal nitride inclusive layer comprises $NiCrN_x$ and is from 20–600 Å thick, and said second dielectric layer comprises silicon nitride and is from 100–500 Å thick.

11. The coated article of claim 10, wherein said first dielectric layer is from 50–120 Å thick, said metal nitride inclusive layer is from 50–350 Å thick, and said second dielectric layer is from 210–310 Å thick.

12. The coated article of claim 1, wherein the article is characterized by the following transmissive color characteristics before said heat treatment:

a* 0.0 to –5.0 b* –2.0 to –15.0

L* 10.0 to 70.0.

13. The coated article of claim 12, wherein the article is characterized by the following transmissive color characteristics before said heat treatment:

a* 0.0 to –2.0 b* –3.0 to –9.0

L* 20.0 to 50.0.

14. The coated article of claim 1, wherein the coated article has a sheet resistance ($R_s$) of no greater than 250 ohms/sq. after said heat treatment, and wherein said heat treatment causes sheet resistance of said coated article to decrease.

15. A heat treated coated article comprising:

a layer system supported by a glass substrate, said layer system comprising a metal nitride inclusive layer located between said glass substrate and an at least partially nitrided dielectric layer, wherein the metal nitride comprises at least one of $NiN_x$ and $CrN_x$ and contacts said dielectric layer; and wherein said coated article has a glass side reflective $\Delta E^*_G$ value no greater than 5.0 in view of thermal tempering including heat treating for at least about 5 minutes.

16. The coated article of claim 15, wherein said coated article has a $\Delta E^*_G$ value no greater than 4.0 after said thermal tempering.

17. The coated article of claim 16, wherein said coated article has a $\Delta E^*_G$ value no greater than 3.0 after heat treatment comprising heat treatment for at least about 5 minutes at temperature of at least about 600 degrees C., and wherein the coated article has a glass side reflective a* color value that is negative both before and after said heat treatment.

18. The coated article of claim 15, wherein said coated article has a glass side reflective $\Delta a^*$ value no greater than 1.0 following said thermal tempering.

19. The coated article of claim 18, wherein said coated article has a glass side reflective $\Delta a^*$ value no greater than 0.6 following said thermal tempering.

20. The coated article of claim 18, wherein said coated article has a glass side reflective $\Delta a^*$ value no greater than 0.3 following said thermal tempering.

21. The coated article of claim 15, wherein the coated article has a glass side reflective a* color value that is negative both before and after said thermal tempering.

22. The coated article of claim 15, wherein said metal nitride inclusive layer comprises $NiCrN_x$.

23. The coated article of claim 15, wherein said dielectric layer is in contact with said metal nitride inclusive layer and comprises silicon nitride.

24. The coated article of claim 15, wherein the coated article has a sheet resistance ($R_s$) of no greater than 500 ohms/sq. after said thermal tempering, and wherein said thermal tempering causes sheet resistance of said coated article to decrease.

25. A heat treated coated article comprising:

a layer system supported by a glass substrate, said layer system comprising a $NiCrN_x$ inclusive layer wherein at least 50% of the Cr is nitrided, said $NiCrN_x$ inclusive layer being located between and contacting first and second dielectric layers, wherein the second dielectric layer is at least partially nitrided and positioned so that the $NiCrN_x$ inclusive layer is between the second dielectric layer and the glass substrate; and wherein said coated article has a transmissive $\Delta E^*_T$ value no greater than 5.0 following or due to heat treatment.

26. The coated article of claim 25, wherein said $NiCrN_x$ inclusive layer is sufficiently nitrided so that the coated article has a $\Delta E^* <= 4.0$ following heat treatment for at least about 5 minutes at temperature of at least 600 degrees C.

27. A method of making a heat treated coated article, the method comprising:

provBiding a glass substrate;

depositing a metal on the substrate in an atmosphere including a significant amount of nitrogen in order to form a metal nitride inclusive layer on the glass substrate;

depositing a dielectric nitride inclusive layer on the substrate over the metal nitride inclusive layer; and heat treating the article which includes at least the metal nitride inclusive layer and the dielectric nitride inclusive layer for at least 5 minutes, the metal nitride inclusive layer being nitrided to an extent so that after said heat treating the article has a ΔE value of no greater than 5.0.

28. The method of claim 27, wherein the article has a ΔE value of no greater than 4.0.

29. The method of claim 28, wherein the article has a ΔE value of no greater than 3.0.

30. The method of claim 27, further comprising depositing another dielectric layer onto the substrate, so that the metal nitride inclusive layer is deposited onto the substrate over the another dielectric layer.

31. The method of claim 27, where the metal nitride inclusive layer comprises $NiCrN_x$, and wherein the dielectric nitride comprises silicon nitride.

32. The method of claim 27, wherein the ΔE value is transmissive or glass side reflective.

33. The method of claim 27, wherein the metal nitride comprises $CrN_x$.

34. A heat treated coated article comprising:

a layer system supported by a glass substrate, said layer system comprising a metal nitride inclusive layer located between first and second dielectric layers, wherein the second dielectric layer is at least partially nitrided and positioned so that the metal nitride inclusive layer is between the second dielectric layer and the glass substrate; and wherein said coated article has a transmissive Δa* value no greater than 1.1 after at least about 5 minutes of heat treatment at temperature of at least about 600 degrees C.

35. The coated article of claim 34, wherein said coated article has a transmissive Δa* value no greater than 0.8 after at least about 5 minutes of heat treatment at temperature of at least about 600 degrees C.

36. A method of making a heat treated coated article, the method comprising:

providing a glass substrate;

depositing a metal on the substrate in an atmosphere including a significant amount of nitrogen in order to form a metal nitride inclusive layer on the glass substrate;

depositing a dielectric nitride inclusive layer on the substrate over the metal nitride inclusive layer; and heat treating the article which includes at least the metal nitride inclusive layer and the dielectric nitride inclusive layer for at least 5 minutes, the metal nitride inclusive layer being nitrided to an extent so that after said heat treating the article has a transmissive Δa* value of no greater than 1.1.

37. The coated article of claim 1, wherein said coated article has a glass side reflective $\Delta b^*_G$ value no greater than 1.1 following said heat treatment.

38. The coated article of claim 1, wherein said coated article has a glass side reflective $\Delta b^*_G$ value no greater than 0.7 following said heat treatment.

39. The coated article of claim 15, wherein said coated article has a glass side reflective $\Delta b^*_G$ value no greater than 1.1 following said thermal tempering.

40. The coated article of claim 25, wherein said coated article has a glass side reflective $\Delta b^*_G$ value no greater than 1.1 following said heat treatment.

41. A heat treated coated article comprising:

a layer system supported by a glass substrate, said layer system comprising a metal nitride inclusive layer located between first and second dielectric layers, wherein the second dielectric layer is at least partially nitrided and positioned so that the metal nitride inclusive layer is between the second dielectric layer and the glass substrate; and wherein said coated article has a glass side reflective $\Delta b^*_G$ value no greater than 1.1 after at least about 5 minutes of heat treatment at temperature of at least about 600 degrees C.

42. The coated article of claim 41, wherein said coated article has a glass side reflective $\Delta b^*_G$ value no greater than 0.7 following said heat treatment.

* * * * *